(12) United States Patent
Mizuta et al.

(10) Patent No.: US 9,792,080 B2
(45) Date of Patent: Oct. 17, 2017

(54) INFORMATION MEDIATION SYSTEM, INFORMATION MEDIATION METHOD, INFORMATION ACCUMULATING SYSTEM, AND INFORMATION PROCESSING METHOD

(71) Applicant: SEIKO EPSON CORPORATION, Tokyo (JP)

(72) Inventors: Masahiko Mizuta, Sapporo (JP); Takumi Oribe, Sapporo (JP); Nobuyuki Saito, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/001,640

(22) Filed: Jan. 20, 2016

(65) Prior Publication Data
US 2016/0216925 A1 Jul. 28, 2016

(30) Foreign Application Priority Data

Jan. 23, 2015 (JP) .................. 2015-010970
Jan. 23, 2015 (JP) .................. 2015-010972

(51) Int. Cl.
*G06F 15/00* (2006.01)
*G06F 3/12* (2006.01)
*G06K 15/00* (2006.01)
*H04L 29/06* (2006.01)

(52) U.S. Cl.
CPC .......... *G06F 3/1288* (2013.01); *G06F 3/1203* (2013.01); *G06F 3/1204* (2013.01); *G06F 3/1205* (2013.01); *G06F 3/1229* (2013.01); *G06F 3/1236* (2013.01); *G06F 3/1273* (2013.01); *G06F 3/1287* (2013.01); *G06K 15/402* (2013.01); *G06K 15/4015* (2013.01); *H04L 67/42* (2013.01)

(58) Field of Classification Search
USPC ....................................... 358/1.15
See application file for complete search history.

(56) References Cited

U.S. PATENT DOCUMENTS

2004/0158661 A1* 8/2004 Mokuya .............. G06Q 10/06
399/24

FOREIGN PATENT DOCUMENTS

| JP | 11-110248 A | 4/1999 |
| JP | 2005-318326 A | 11/2005 |
| JP | 2009-140455 A | 6/2009 |

(Continued)

*Primary Examiner* — Saeid Ebrahimi Dehkord
(74) *Attorney, Agent, or Firm* — Foley & Lardner LLP

(57) ABSTRACT

An information mediation system includes a printer and an information mediation device which accumulates operation information that is modified according to an operation of the printer from the printer, in which the information mediation device has an operation information accumulating section which accumulates operation information of a type according to specifications of the printer from the printer, and a specification sensing section which senses a modification in the specifications of the printer, and the operation information accumulating section queries the type of operation information that is to be accumulated in a printer in which a modification of the specifications is sensed by the specification sensing section to an external management apparatus and accumulates the operation information of the type that is indicated by the query result from the printer in which the modification of the specifications is sensed.

15 Claims, 17 Drawing Sheets

(56) References Cited

FOREIGN PATENT DOCUMENTS

| JP | 2011-022941 A | 2/2011 |
|----|---------------|--------|
| JP | 2013-041597 A | 2/2013 |

\* cited by examiner

FIG. 3

| TYPE | ADDRESS | OPERATION INFORMATION |
|---|---|---|
| ELAPSED TIME AFTER POWER ACTIVATION | a1 | v1 |
| AMOUNT OF Y INK CONSUMPTION | a2 | v2 |
| AMOUNT OF M INK CONSUMPTION | a3 | v3 |
| AMOUNT OF C INK CONSUMPTION | a4 | v4 |
| AMOUNT OF K INK CONSUMPTION | a5 | v5 |
| CUMULATIVE AMOUNT OF ROLLER ROTATION | a6 | v6 |
| ... | ... | ... |

FIG. 5

| PRINTER IP | CONCENTRATION TYPE | FW VERSION |
|---|---|---|
| p1 | m1 | ver.1 |
| p2 | m2 | ver.2 |
| p3 | m3 | ver.3 |

FIG. 6

| CONCENTRATION TYPE | FW VERSION | TYPE |
|---|---|---|
| ... | ... | AMOUNT OF Y, M, C, K INK CONSUMPTION, ELAPSED TIME AFTER POWER ACTIVATION |
| p1 | ver.1 | AMOUNT OF K INK CONSUMPTION, ELAPSED TIME AFTER POWER ACTIVATION |
| ... | ... | CUMULATIVE ROLLER TIME, ELAPSED TIME AFTER POWER ACTIVATION |
| ... | ... | ... |
| ... | ... | ... |
| ... | ... | ... |
| ... | ... | ... |

FIG. 7

| ACQUISITION DATE AND TIME | PRINTER IP | OPERATION INFORMATION |
|---|---|---|
| t1 | p1 | ... |
| t2 | p1 | ... |
| t3 | p3 | ... |
| t4 | p2 | ... |
| t5 | p5 | ... |
| t6 | p2 | ... |
| ... | ... | ... |

FIG. 12

| TIME Ta1 | ADDRESS | OPERATION INFORMATION |
|---|---|---|
| | a1 | v1 |
| | a2 | v2 |
| | a3 | v3 |
| | a4 | v4 |
| | a5 | v5 |
| | a6 | v6 |
| | a7 | v7 |
| | a8 | v8 |
| | a9 | v9 |
| | a10 | v10 |

| TIME Ta2 | ADDRESS | OPERATION INFORMATION |
|---|---|---|
| | a1 | v11 |
| | a2 | v2 |
| | a3 | v3 |
| | a4 | v4 |
| | a5 | v5 |
| | a6 | v6 |
| | a7 | v7 |
| | a8 | v8 |
| | a9 | v9 |
| | a10 | v10 |

| TIME Ta3 | ADDRESS | OPERATION INFORMATION |
|---|---|---|
| | a1 | v11 |
| | a2 | v12 |
| | a3 | v3 |
| | a4 | v4 |
| | a5 | v5 |
| | a6 | v6 |
| | a7 | v7 |
| | a8 | v8 |
| | a9 | v9 |
| | a10 | v10 |

FIG. 14

| | BEFORE ACQUISITION | AFTER ACQUISITION |
|---|---|---|
| Tb1 | OPERATION INFORMATION<br>v1<br>v2<br>v3<br>v4<br>v5<br>v6<br>v7<br>v8<br>v9<br>v10 | OPERATION INFORMATION<br>v11<br>v12<br>v13<br>v14<br>v15<br>v16<br>v17<br>v18<br>v19<br>v10 |
| Tb2 | OPERATION INFORMATION<br>v1<br>v2<br>v3<br>v4<br>v5<br>v6<br>v7<br>v8<br>v9<br>v10 | OPERATION INFORMATION<br>v11<br>v12<br>v13<br>v14<br>v15<br>v16<br>v17<br>v18<br>v19<br>v20 |
| Tb3 | OPERATION INFORMATION<br>v1<br>v2<br>v3<br>v4<br>v5<br>v6<br>v7<br>v8<br>v9<br>v10 | OPERATION INFORMATION<br>v21<br>v12<br>v13<br>v14<br>v15<br>v16<br>v17<br>v18<br>v19<br>v20 |

INFORMATION MEDIATION SYSTEM, INFORMATION MEDIATION METHOD, INFORMATION ACCUMULATING SYSTEM, AND INFORMATION PROCESSING METHOD

BACKGROUND

1. Technical Field

The invention relates to a technique in which operation information of a printer is accumulated.

2. Related Art

JP-A-2005-318326 describes a technique in which a plurality of office devices which are connected to a network are managed by an office device management apparatus. The office device management apparatus accumulates status information which indicates a status of each of the office devices (toner running out) from each of the office devices via the network. Then, the office device management apparatus displays the status, which is indicated by the accumulated status information, of each office device toward a manager.

In a configuration in which the printer that is connected to the network is managed by a management apparatus, it is possible to accumulate a type of the operation information according to the specifications of the printer (for example, toner color or the like) from the printer in the management apparatus to be useful in management of the printer. In detail, in JP-A-2005-318326, a remaining amount of toner of each color which is used by the printer (operation information) is accumulated and displayed toward the manager.

Here, in the printer which is connected to the network, there are times when the specifications (toner color or number of toners, number of settable paper rolls, number of discharge trays, and the like) are modified due to, for example, a modification or the like of firmware. At this time, in a case where the specifications after modification of the printer are known, it is possible to appropriately accumulate the type operation information according to the specifications of the printer even after specifications modification. However, in other cases, it is possible for a situation to occur such that it is not possible to accumulate the type of operation information according to the specifications of the printer.

SUMMARY

An advantage of some aspects of the invention is to provide a technique in which it is possible to suppress occurrence of the circumstances in which it is not possible to accumulate the type of operation information from the printer according to the specifications of the printer after modification in a case where the specifications of the printer which is connected to the network are modified.

In addition, it is necessary to access each of the plurality of printers in order to accumulate the operation information (status information) from the plurality of printers described above. At this time, it is appropriate that it is possible to access each printer at an appropriate timing.

Another advantage of some aspects of the invention is to provide a technique in which it is possible to accumulate operation information from each printer by respectively accessing a plurality of printers at appropriate timings.

According to an aspect of the invention, there is provided an information mediation system including a printer and an information mediation device which accumulates operation information that is modified according to an operation of the printer from the printer, in which the information mediation device has an operation information accumulating section which accumulates operation information of a type according to specifications of the printer from the printer, and a specification sensing section which senses a modification in specifications of the printer, the operation information accumulating section queries the type of operation information that is to be accumulated in a printer in which a modification of the specifications is sensed by the specification sensing section to an external management apparatus and accumulates the operation information of the type that is indicated by the query result from the printer in which the modification of the specifications is sensed.

According to another aspect of the invention, there is provided an information mediation method including sensing modification of specifications of a printer which is connected to an information mediation device via a network using the information mediation device, querying from the information mediation device to a management apparatus the type of operation information that is to be accumulated in the printer in which a modification of the specifications is sensed when the operation information which is modified according to the operation of the printer is accumulated from the printer, and accumulating, in the information mediation device, the operation information of the type that is indicated by the query result from the printer in which the modification of the specifications is sensed.

According to still another aspect of the invention, there is provided an information accumulating system including a printer, an information mediation device which accumulates operation information that is modified according to an operation of the printer from the printer, and a management apparatus which stores a type of the operation information that is to be accumulated from the printer, in which the information mediation device has an operation information accumulating section which accumulates operation information of the type according to specifications of the printer from the printer, and a specification sensing section which senses a modification in specifications of the printer, the operation information accumulating section queries the type of operation information that is to be accumulated in the printer in which a modification of the specifications is sensed by the specification sensing section to an external management apparatus, and accumulates the operation information of the type that is indicated by the query result from the printer in which the modification of the specifications is sensed.

In the invention which is configured in this manner (the information mediation system, the information mediation method, and the information accumulating system), when the modification of the specifications of the printer which is connected to the network is sensed, the type of operation information that is to be accumulated in the printer in which a modification of the specifications is sensed is queried to the management apparatus. Then, the operation information of the type that is indicated by the query result is accumulated from the printer in which the modification of the specifications is sensed. Accordingly, it is possible to suppress occurrence of the circumstances in which it is not possible to accumulate the type of operation information from the printer according to the specifications of the printer after modification in a case where the specifications of the printer which is connected to the network is modified.

The information mediation system may be configured such that the operation information accumulating section accumulates the operation information via a network from the printer which is connected to the network, the information mediation device has a connection sensing section which senses that the printer is connected to the network, the operation information accumulating section queries the type of the operation information to be accumulated to the management apparatus in the printer which is sensed to be connected to the network, and the operation information of the type that is indicated by the query result is accumulated from the printer which is sensed to be connected to the network. With this configuration, even in a case where the printer is newly connected to the network, it is possible to suppress occurrence of the circumstances in which it is not possible to accumulate the type of operation information from the printer according to the specification of the printer which is a connection target.

The information mediation system may be configured such that the operation information accumulating section transmits the accumulated operation information to the management apparatus. With this configuration, it is possible accumulate an appropriate type of operation information in the management apparatus according to the specification of the printer.

The information mediation system may be configured such that the operation information accumulating section transmits the operation information to the management apparatus at a lower frequency than the frequency at which the printer is accessed in order to accumulate the operation information.

The information mediation system may be configured such that the operation information accumulating section stores the operation information in a history table by associating an identifier which identifies the printer in which the operation information is acquired and an acquired date and time at which the operation information is acquired.

The information mediation system may be configured such that when an operation information acquiring section acquires the operation information from the printer, in a case where comparison results of the acquired operation information and the operation information which is recorded in the history table are different, the acquired operation information is recorded in the history table, and in a case where the comparison results are the same, the acquired operation information is not recorded in the history table. With this configuration, it is possible to save a storage resource for storing in the history table.

The information mediation system may be configured such that, in a case where the comparison results are different, the operation information acquiring section transmits the acquired operation information to the management apparatus, and in a case where the comparison results are the same, the operation information acquiring section does not transmit the acquired operation information to the management apparatus. With this configuration, it is possible to suppress an amount of transmission to the management apparatus.

The information mediation system may be configured to further include a database which indicates the type of the operation information which is to be accumulated, in which the operation information accumulating section accumulates the operation information of the type which is indicated by the database. With this configuration, it is possible to reliably accumulate the operation information of the type which is to be accumulated based on the database.

The information accumulating system may be configured such that as a result of the query to the management apparatus, when the type of the operation information which is to be accumulated is added, the operation information accumulating section adds the type of the added operation information to the database. With this configuration, it is possible to add the type of the operation information which is accumulated from the printer by a simple process in which the type of the operation information is added to the database.

The information accumulating system may be configured such that when a notification of the type of the operation information in which accumulation is unnecessary is received from the management apparatus, the operation information accumulating section deletes the type of the operation information in which accumulation is unnecessary from the database. With this configuration, it is possible to delete the type of the operation information which is accumulated from the printer by a simple process in which the type of the operation information is deleted from the database.

According to still another aspect of the invention, there is provided an information processing method including determining, for each printer, a timing at which an information accumulating device which is able to communicate with a plurality of printers accesses a printer in order to accumulate operation information that is modified according to an operation of the printer from the printer, and accumulating the operation information from the printer by accessing the printer at a timing which is determined by the information accumulating device.

In the invention which is configured in this manner (information processing method), the information accumulating device which is able to communicate with the plurality of printers accesses the printer in order to accumulate, from the printer, operation information which is modified according to the operation of the printer. Moreover, the timing of the access is determined for each printer. Accordingly, it is possible to accumulate the operation information from each printer by respectively accessing the plurality of printers at appropriate timings.

That is, a reference when the timing at which the printer is accessed is determined is able to be variously assumed. For example, the timing at which the printer is accessed may be determined for each printer based on an amount of information of the operation information which is to be accumulated from the printer during a predetermined time. Alternatively, the timing at which the printer is accessed may be determined for each printer based on a determination result of presence or absence of a possibility that accumulation leakage of the operation information from the printer to the information accumulating device occurs.

The information processing method may be configured to further include recording the operation information which is accumulated by the information accumulating device in an acquired history table, in which presence or absence of a possibility that accumulation leakage of the operation information from the printer occurs is determined based on a result of a comparison of operation information which is accumulated by accessing the printer and operation information which is recorded in the acquired history table. Thereby, it is possible to ascertain presence or absence of a possibility of accumulation leakage of the operation information.

The information processing method may be configured such that an access frequency to the printer for which it is determined that there is the possibility that accumulation leakage of the operation information occurs is increased. Thereby, it is possible to reduce the likelihood of operation information not being accumulated due to accumulation leakage of the operation information.

The information processing method may be configured such that an access frequency to the printer for which it is determined that there is no possibility that accumulation leakage of the operation information occurs is lowered. Thereby, it is possible to suppress a load which is applied to the information accumulating device.

The information processing method may be configured so as to further include confirming the number of the plurality of printers with which the information accumulating device is able to communicate, and lowering the frequency at which a predetermined printer is accessed out of the plurality of printers in a case where the number of confirmed printers is greater than a threshold number. With this configuration, it is possible to suppress the load which is applied on the information accumulating device even in a case where the number of printers that it is possible to communicate with is large.

The information processing method may be configured such that the information processing device acquires the operation information from the printer using an SNMP as a network management protocol, and in a case where the number of confirmed printers is larger than the threshold number, an access frequency to the printer corresponding to acquisition of the operation information using an expanded MIB is lowered out of the plurality of printers.

The information processing method may be configured such that an access frequency to the printer is lowered based on a recorded result of access history to the printer from the information accumulating device. With this configuration, actual past results are referenced when the access frequency to the printer is lowered. For this reason, it is possible to lower the access frequency to the printer while suppressing occurrence of accumulation leakage of the operation information.

BRIEF DESCRIPTION OF THE DRAWINGS

The invention will be described with reference to the accompanying drawings, wherein like numbers reference like elements.

FIG. 3 is a diagram schematically illustrating a storage mode for operation information in a memory section of the printer.

FIG. 5 is a diagram schematically illustrating a configuration of a printer table.

FIG. 6 is a diagram schematically illustrating a configuration of an operation information accumulating table.

FIG. 7 is a diagram schematically illustrating a configuration of a history table.

FIG. 12 is a diagram schematically illustrating a storage mode for operation information in an operation information buffer.

FIG. 14 is a diagram schematically illustrating a recording mode of the operation information in an acquired history table.

DESCRIPTION OF EXEMPLARY EMBODIMENTS

First Embodiment

Figure 1:
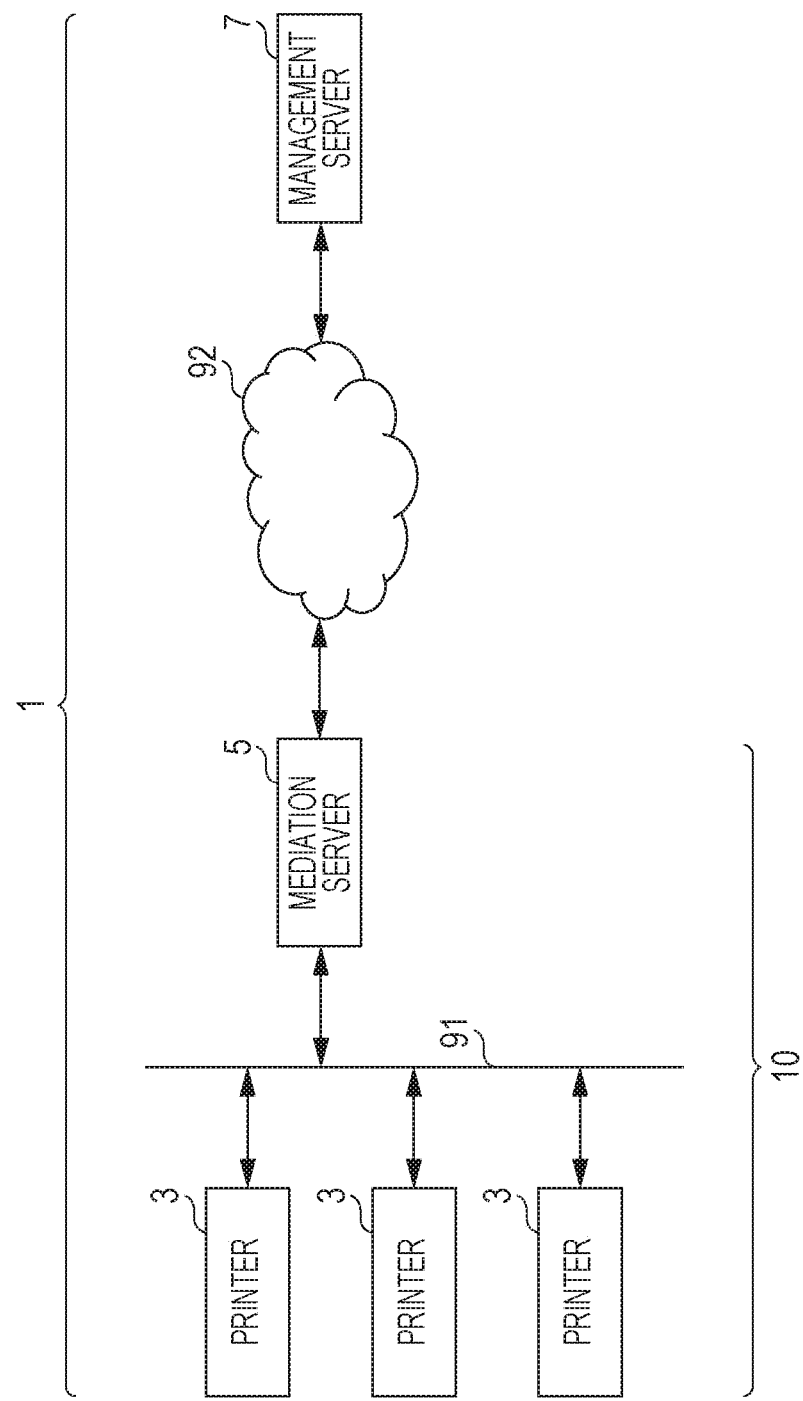
FIG. 1 is a diagram schematically illustrating an example of an information accumulating system according to a first embodiment of the invention.

FIG. 1 is a diagram schematically illustrating an example of an information accumulating system according to a first embodiment of the invention. An information accumulating system 1 according to the first embodiment accumulates operation information of a printer 3 in a management server 7 via a mediation server 5. In the information accumulating system 1, a plurality of printers 3 and the mediation server 5 are connected to a local area network (LAN) 91, and it is possible to communicate in both directions via the LAN 91. In addition, in the information accumulating system 1, the mediation server 5 and the management server 7 are connected to the Internet 92, and it is possible to communicate in both directions via the Internet 92. Here, the LAN 91 and the Internet 92 are indicated as an example of a communication line, and the detailed configuration of the communication line is not limited to the connection between the printers 3 and the mediation server 5, or the mediation server 5 and the management server 7.

An information mediation system 10 which is configured by the plurality of printers 3, the LAN 91, and the mediation server 5 accumulates, using the mediation server 5, operation information of each printer 3 and transmits to an external management server 7. For example, the mediation server 5 is constructed within a facility of the same company, and accumulates the operation information of the information accumulating system 1 which is used in the company and transmits to the management server 7. Here, in FIG. 1, one information mediation system 10 is described, but it is also possible to configure the information accumulating system 1 by connecting a plurality of information mediation systems 10 to the management server 7.

Figure 2:
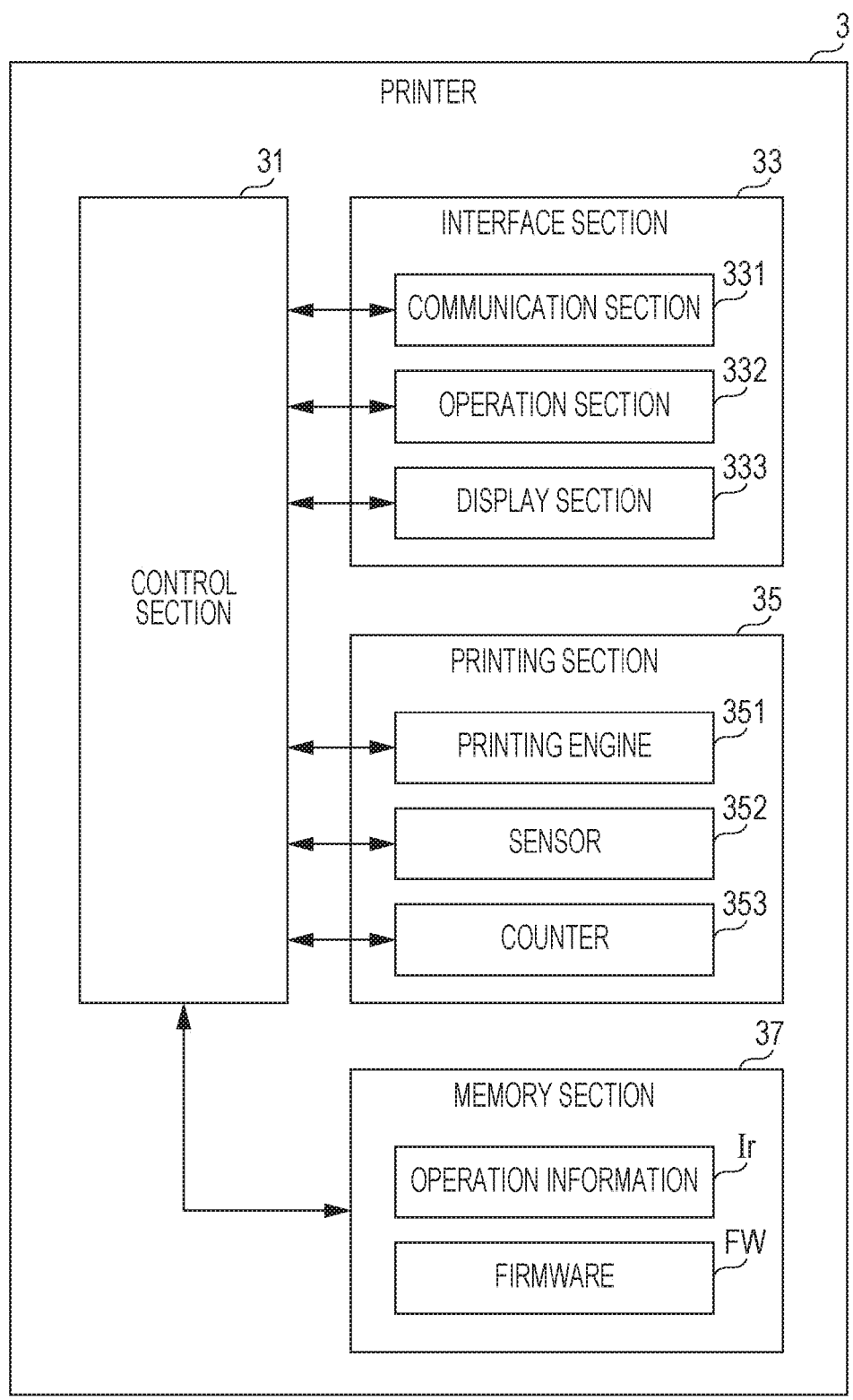
FIG. 2 is a block diagram illustrating an example of a configuration of a printer.

FIG. 2 is a block diagram illustrating an example of a configuration of the printer. The printer 3 is provided with a control section 31, an interface section 33, a printing section 35, and a memory section 37. The control section 31 is a computer which is configured by a central processing unit (CPU) and a random access memory (RAM), and collectively controls operations which are executed by the printers 3. Accordingly, the interface section 33, the printing section 35, and the memory section 37 operate by receiving control from the control section 31.

The interface section 33 is responsible for an interface function between an external apparatus or a user. A communication section 331 is connected to the LAN 91, and executes communication with the mediation server 5 via the LAN 91. In addition, an operation section 332 is configured by a button and the like which receives an input operation from the user, and a display section 333 is configured by a display and the like which displays various information which relates to the printer 3 to the user. Here, the operation section 332 and the display section 333 may be, for example, integrally configured by a touch panel.

The printing section 35 is provided with a printing engine 351, a sensor 352, and a counter 353. The printing engine 351 is mechanically configured to execute printing of an image on a printing medium. The printing engine 351 prints the image on the printing medium by discharging ink from a discharge head of an ink jet head type with respect to a winding-type printing medium (web) which is transported roll-to-roll. Here, the detailed configuration of the printing engine 351 is not limited to the exemplification here, and the printing engine 351 may print on a sheet-type printing medium, and may print using toner with a laser method. Then, the sensor 352 detects various physical quantities involved in an operation state of the printing engine 351, and the counter 353 counts various numerical values which change accompanying the operation of the printing engine 351.

The physical quantities which indicate the operation state of the printing engine 351 are, for example, voltage which is applied to an electrical component of the printing engine 351, temperature and humidity within the printing engine 351, a position of the discharge head or the printing medium, and the like. Then, in order to detect the physical quantities, various sensors 352 are provided such as a voltage sensor, a temperature and humidity sensor, a position sensor, and an acceleration sensor. In addition, the numerical value which changes accompanying operation of the printing engine 351 is, for example, elapsed time after power activation of the printing engine 351, cumulative length of the printed printing medium, amount of ink consumption (or a remaining amount), cumulative amount of rotation of the rotating mechanical component (for example, a roller on which the printing medium is transported), and the like. Then, various counters 353 are provided in order to count the numerical values.

The memory section 37 is configured by a storage medium of a read only memory (ROM), a hard disk drive (HDD), or a RAM, and stores data which is output from the sensor 352 and the counter 353 as operation information Ir which indicates the operation state of the printer 3. FIG. 3 is a diagram schematically illustrating a storage mode for operation information in the memory section of the printer. As shown in FIG. 3, the memory section 37 associates the type of the operation information and an address of the memory, and each set of operation information Ir is stored at an address which corresponds to the type. As a specific example, operation information v1 which indicates a value of elapsed time after power activation is stored at an address a1 which corresponds to the type.

In addition, the memory section 37 as shown in FIG. 2, stores firmware FW which specifies the operation of the printer 3 when printing is executed. Then, the control section 31 internally realizes each necessary function in execution of printing by reading the firmware FW which is stored in the memory section 37 and executing the firmware FW. In detail, a function of performing rendering in which the communication section 331 receives a print job from the external apparatus is converted into print data, a function of controlling the printing engine 351 based on the print data, and the like are realized within the control section 31. Thereby, the image which is indicated by a print job is printed on the printing medium.

Figure 4:
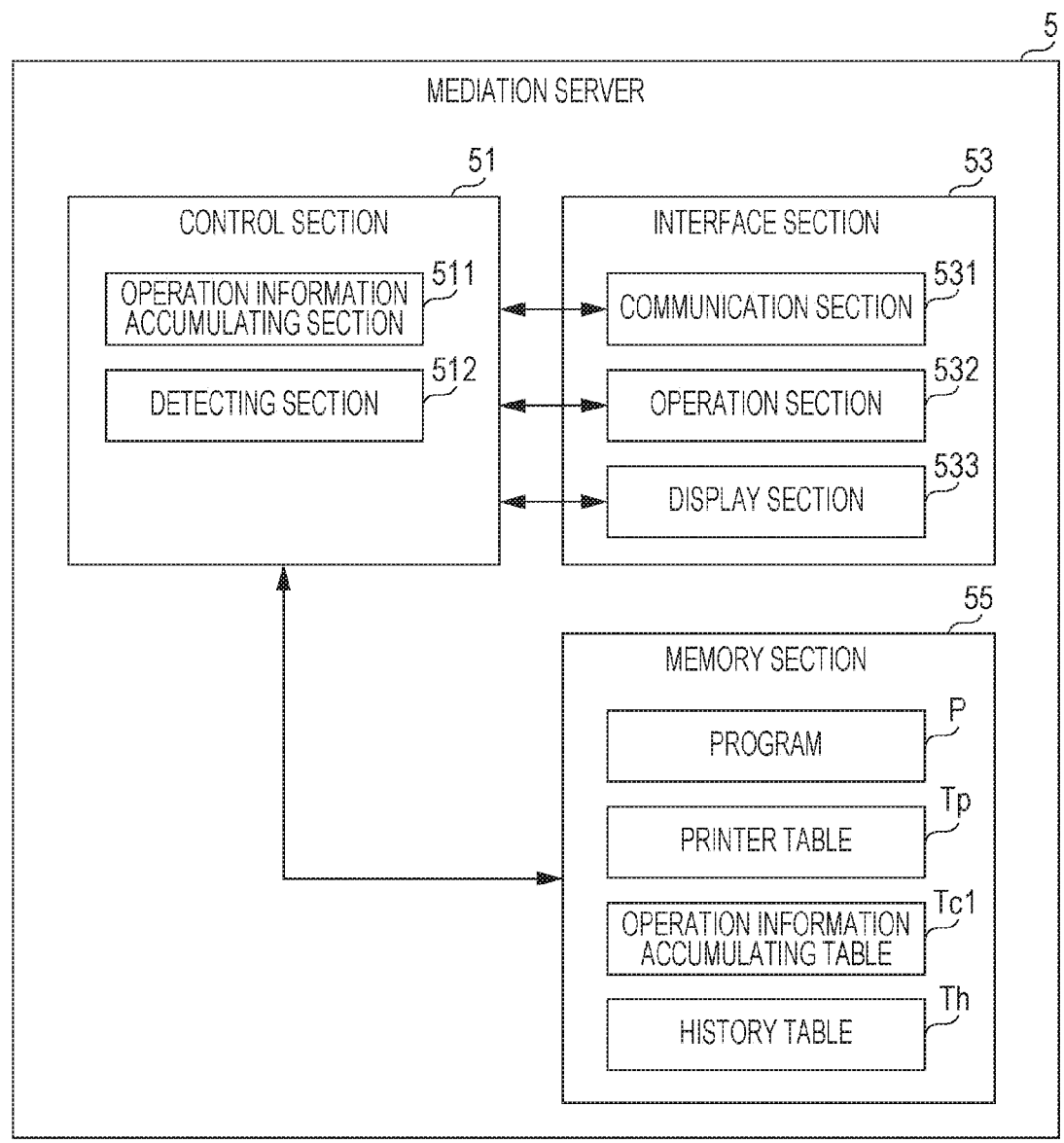
FIG. 4 is a block diagram illustrating an example of a configuration of a mediation server.

FIG. 4 is a block diagram illustrating an example of a configuration of the mediation server. The mediation server 5 is provided with a control section 51, an interface section 53, and a memory section 55, accumulates the operation information Ir by accessing the memory section 37 of each of the plurality printers 3, and executes an information mediation operation in which the accumulated operation information Ir is transmitted on the management server 7. The control section 51 is a computer which is configured by a CPU and a RAM, and the information mediation operation is mainly executed while using the interface section 53 and the memory section 55.

The interface section 53 is responsible for an interface function between the external apparatus or the user. The communication section 531 is connected to the LAN 91 and the Internet 92, and executes communication with the management server 7 via the Internet 92 while executing communication with each printer 3 via the LAN 91. In addition, an operation section 532 is configured by a mouse, a keyboard, and the like which receives the input operation from the user, and a display section 533 is configured by a display and the like which display various information to the user. Here, the operation section 532 and the display section 533 may be, for example, integrally configured by a touch panel.

The memory section 55 is configured by the storage medium of a ROM, HDD, or RAM, and stores a program P which specifies the information mediation operation. Then, the control section 51 is constructed by an operation information accumulating section 511 and a sensing section 512 by executing the program P which is read from the memory section 55. Then, the operation information accumulating section 511 and the sensing section 512 which are constructed within the control section 51 execute the information mediation operation by working together with the memory section 55 in the following manner.

An Internet protocol (IP) address of each printer 3 (hereinafter referred to as "printer IP") is, for example, stored in advance in the memory section 55 by the input operation of the user, and the operation information accumulating section 511 acquires the model and the firmware FW version (hereinafter referred to as "FW version") of a target printer 3 by accessing each printer 3 based on the printer IP. Then, on the mediation server 5, the information which is accumulated by the operation information accumulating section 511 is recorded in a printer table Tp (FIG. 5) which is stored in the memory section 55. Here, FIG. 5 is a diagram schematically illustrating a configuration of the printer table. As shown in FIG. 5, the model and the FW version of each printer 3 is associated with the printer IP of the printer 3 and recorded in the printer table Tp.

That is, communication between the mediation server 5 and the printer 3 is executed using a simple network management protocol (SNMP). That is, in the mediation server 5 which is a manager, SNMP manager software is operated, and in the printer 3 which is an agent, SNMP agent software is operated. In the printer 3, a management information base (MIB) file is implemented in the printer 3, and the mediation server 5 acquires an MIB tree (MIB structure) of each printer 3 using, for example, using an snmpwalk command. Then, the mediation server 5 acquires an object identifier of target information which references the MIB tree, and issues an acquisition command to the printer 3 with respect to the object identifier. Meanwhile, the printer 3 which receives the acquisition command transmits the target information which corresponds to the object identifier of the acquisition command to the mediation server 5. On the mediation server 5 set in this manner, the printer 3 acquires the target information from the address of the memory section 37 which stores the target information.

In addition, the operation information accumulating section 511 accumulates the operation information Ir from each of the plurality of printers 3 based on the operation information accumulating table Tc1 (FIG. 6) which is stored in the memory section 55. Here, FIG. 6 is a diagram schematically illustrating a configuration of an operation information accumulating table. As shown in FIG. 6, in the operation information accumulating table Tc1, the type of the operation information Ir which is to be accumulated from the printer 3 is recorded to be associated in combination with the model and the FW version of the printer 3. Thereby, it is possible to accumulate the operation information Ir of an appropriate type according to the combination of the model and the FW version of the printer 3.

That is, the operation information accumulating section 511 determines the model and the FW version of the printer 3 from the printer table Tp, and based on the result therefrom and the operation information accumulating table Tc1, determines the type of the operation information Ir which is to be accumulated from the printer 3. Then, the operation information accumulating section 511 accumulates the type of operation information Ir which is determined in such a manner from the memory section 37 of the printer 3.

According to the printer table Tp in FIG. 5, for example, the combination of the model and the FW version of the printer 3 with a printer IP "p1" is (m1, ver.1). According to the operation information accumulating table Tc1 in FIG. 6, the printer 3 of the combination is specified such that a roller calculation time and the elapsed time after power activation are accumulated. Accordingly, the operation information accumulating section 511 accumulates the operation information Ir of this type from the memory section 37 of the printer 3 with the printer IP "p1".

That is, in the memory section 37 as shown in FIG. 3, the type of operation information Ir and the address are associated. Accordingly, the operation information accumulating section 511 accesses the address which corresponds to the type of accumulation target while referencing the MIB tree described above, and accumulates the operation information Ir which is stored at the address. In this manner, the operation information accumulating section 511 accumulates the type of operation information Ir which is specified by the printer table Tp and the operation information accumulating table Tc1 from the memory section 37 of each printer 3.

Then, the operation information accumulating section 511 records the accumulated operation information Ir in a history table Th (FIG. 7) which is stored in the memory section 55. Here, FIG. 7 is a diagram schematically illustrating a configuration of the history table. As shown in FIG. 7, in the history table Th, the operation information Ir is recorded in association with the printer IP of the printer 3 in which the operation information Ir is acquired, and an acquisition time and date of the operation information Ir.

At this time, the operation information accumulating section 511 records the operation information Ir in the history table Th only in a case where there is a change in the acquired operation information Ir. That is, concerning the printer 3 in which the operation information Ir is newly acquired, the operation information accumulating section 511 compares the same type of operation information Ir which is acquired in the past and the operation information Ir which is newly acquired. Then, the operation information Ir which is acquired in a case where the comparison results are different is added so as to be recorded in the history table Th, and in a case where the comparison results are the same, the acquired operation information Ir is not recorded in the history table Th. Thereby, saving of storage resources of the memory section 55 is achieved.

Here, in such a configuration, in a case where the firmware FW version of the printer 3 is modified, it is possible to change the type of the operation information Ir which is to be accumulated from the printer 3. In order to cope with this, the control section 51 is constructed by a sensing section 512. That is, the sensing section 512 senses a modification of the firmware FW version of the printer 3. When the sensing section 512 senses the modification of the version, the operation information accumulating section 511 queries the type of the operation information Ir that is to be accumulated in the printer 3 in which the version is modified to the management server 7. Then, the operation information accumulating section 511 updates the contents of the operation information accumulating table Tc1 according to the query result, and executes subsequent accumulation of the operation information Ir based on the operation information accumulating table Tc1 after the update.

Figure 8:
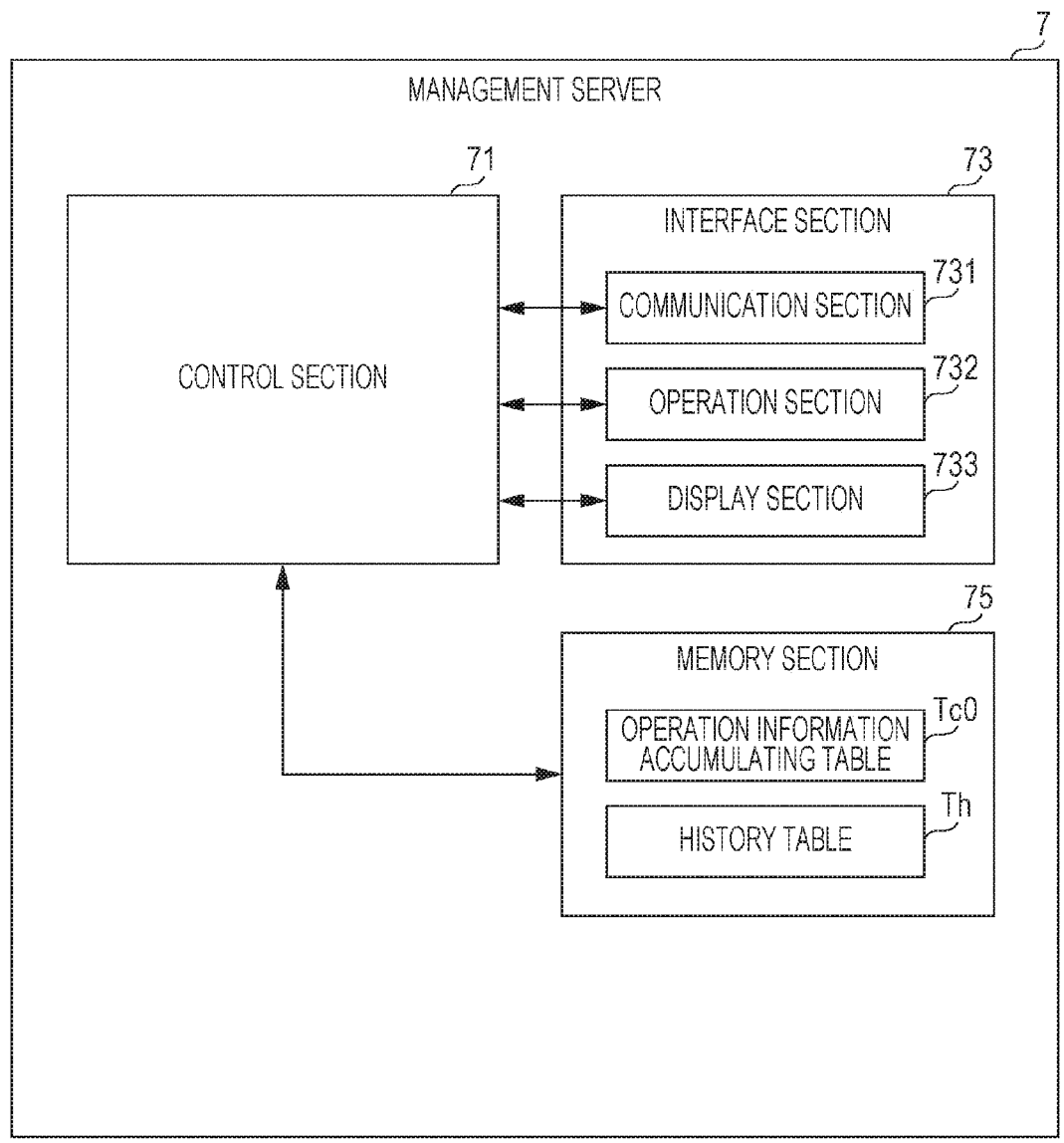
FIG. 8 is a block diagram illustrating an example of a configuration of a management server.

FIG. 8 is a block diagram illustrating an example of a configuration of the management server. The management server 7 is provided with a control section 71, an interface section 73, and a memory section 75, receives the operation information Ir which is accumulated by the mediation server 5, and responds to the query from the mediation server 5. The control section 71 is a computer which is configured by a CPU and a RAM, and a predetermined operation is executed while using the interface section 73 and the memory section 75.

The interface section 73 is responsible for an interface function between the external apparatus or the user. A communication section 731 is connected to the Internet 92, and executes communication with the mediation server 5 via the Internet 92. In addition, an operation section 732 is configured by a mouse, a keyboard, and the like which receives the input operation from the user, and a display section 733 is configured by a display and the like which displays various information to the user. Here, the operation section 732 and the display section 733 may be, for example, integrally configured by a touch panel.

The memory section 75 is configured by the storage medium which is a ROM, HDD, or RAM. The history table Th is stored in the memory section 75. Here, the history table Th is equipped with the same configuration as the history table Th described above basically, and the operation information Ir which is transmitted from the mediation server 5 is recorded.

Furthermore, an operation information accumulating table Tc0 is stored in the memory section 75. The operation information accumulating table Tc0 is equipped with the same configuration as the operation information accumulating table Tc1 described above basically. However, the operation information accumulating table Tc0 records the type of the operation information Ir which is to be accumulated in the entire combination of the model and the FW version that it is possible to take with respect to the operation information accumulating table Tc1 in which it is sufficient to only record information which relates to the combination of the model and the FW version which the printer 3 that is connected to the LAN 91 has in the information mediation system 10. Here, a new version of the firmware of the printer 3 is developed by a printer manufacturer, and is executed by the operation information accumulating table Tc0 of the management server 7 being updated when a new model of the printer 3 is developed. Then, in a case where there is a query from the mediation server 5 as described above, the control section 71 of the management server 7 responds to the query by referring to the operation information accumulating table Tc0.

Figure 9:
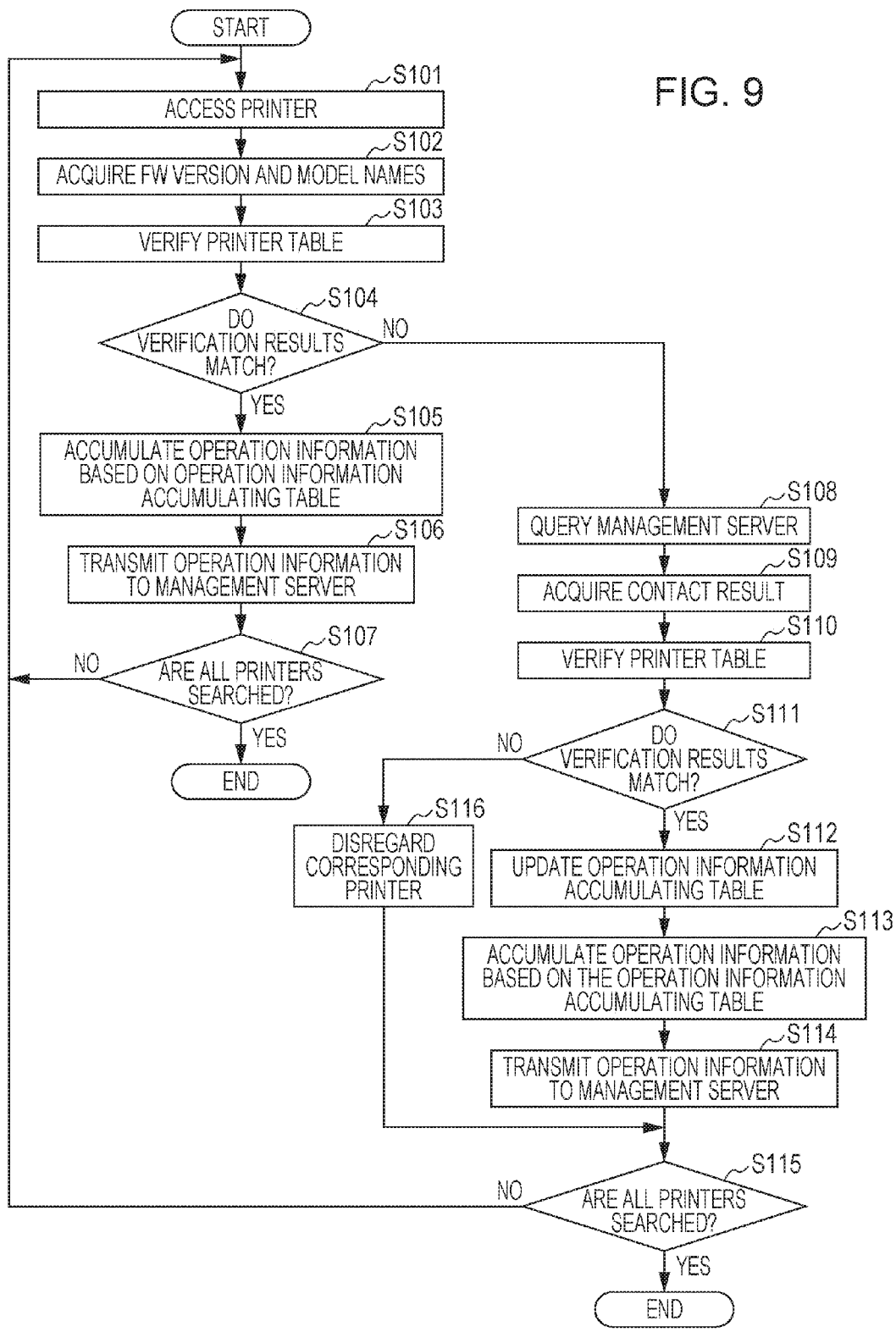
FIG. 9 is a flow chart illustrating an example of an information mediation operation which is executed by the mediation server.

FIG. 9 is a flow chart illustrating an example of an information mediation operation which is executed by the mediation server. The flow chart in FIG. 9 is executed by performing calculation which is specified in the program P by the mediation server 5. When the flow chart in FIG. 9 starts, within the information mediation system 10, the sensing section 512 accesses the memory section 37 of the printer 3 which is connected to the LAN 91 (step S101), and acquires the model and FW version of the printer 3 (step S102). Here, access to the memory section 37 of the printer 3 is executed with reference to the MIB tree which is acquired in advance from the printer 3 as described above. Then, the sensing section 512 collates the model and the FW version which are associated by the printer table Tp with respect to the printer IP of the printer 3 that is accessed in step S101, and the model and FW version which are acquired in step S102.

In a case where the collocation results match in step S103 (the case of "YES" in step S104), concerning the printer 3 which is accessed in step S101, it is possible to determine that the FW version is not modified. Therefore, the operation information accumulating section 511 accumulates the operation information Ir from the printer 3 which is accessed in step S101 based on the existing operation information accumulating table Tc1 (step S105), and the accumulated operation information Ir is transmitted to the management server 7 (step S106).

That is, in step S106, the operation information accumulating section 511 transmits to the management server 7 only in a case where the acquired operation information Ir is modified. That is, concerning the printer 3 in which the operation information Ir is newly acquired, the operation information accumulating section 511 compares the same type of operation information Ir from the past which is recorded in the history table Th and the operation information Ir which is newly acquired. Then, in a case where the comparison results are different, the acquired operation information Ir is transmitted to the management server 7. At this time, in the manner described above, addition and recording of the operation information Ir to the history table Th is performed. Meanwhile, in the case in which the comparison results are the same, the acquired operation information Ir is not transmitted to the management server 7, and in the manner described above, recording of the operation information Ir is not performed in the history table Th. Thereby, suppression of the amount of transmission (traffic) to the management server 7 is achieved.

Then, in step S107, it is determined whether or not searching is performed for all of the printers 3 which are connected to the LAN 91 of the information mediation system 10. Then, in a case where there are unsearched printers 3 (the case of "NO" in step S107), the process returns to step S101, then in a case where the searching ends for all printers 3 (the case of "YES" in step S107), the flow chart in FIG. 9 ends.

In a case where the collocation results do not match in step S103 (the case of "NO" in step S104), concerning the printer 3 which is accessed in step S101, it is possible to determine that the FW version is modified. Therefore, the operation information accumulating section 511 queries the type of the operation information Ir which is to be accumulated in combination of the acquired model and the FW version in step S102 to the management server 7 (step S108). The management server 7 notifies the type of the operation information Ir which is specified in the operation information accumulating table Tc0 to be accumulated by combining according to the query is notified to the operation information accumulating section 511. At this time, the management server 7 notifies not only the type of the operation information Ir, but also notifies the operation information accumulating section 511 of the corresponding model and FW version together in the operation information accumulating table Tc0.

In this manner, when the operation information accumulating section 511 acquires the query result (step S109), the operation information accumulating section 511 collates the model and FW version which are acquired in step S102 and the model and FW version which are included in the query result (step S110). In a case where the collation results in step S110 match (the case of "YES" in step S111), concerning the combination of the model and the FW version which are acquired in step S102, the operation information accumulating section 511 adds and updates the specification to the operation information accumulating table Tc1 when the type of operation information Ir which is received in step S109 is acquired (step S112). Then, the operation information accumulating section 511 accumulates the operation information Ir from the printer 3 which is accessed in step S101 based on the post-update operation information accumulating table Tc1 (step S113), and the accumulated operation information Ir is transmitted to the management server 7 (step S114).

In step S115, it is determined whether or not searching is performed for all of the printers 3 which are connected to the LAN 91 of the information mediation system 10. Then, in a case where there are unsearched printers 3 (the case of "NO" in step S115), the process returns to step S101, then in a case where the searching ends for all printers 3 (the case of "YES" in step S115), the flow chart in FIG. 9 ends. That is, in a case where the collocation results do not match in step S110 (the case of "NO" in step S111), concerning the printer 3 which is accessed in step S101, the operation information accumulating section 511 determines that accumulation of the operation information Ir is not performed (step S116), and the process proceeds to step S115.

In the embodiment as described above, when the modification of the FW version of the printer 3 that is connected to the LAN 91 is sensed, the type of the operation information Ir that is to be accumulated in the printer 3 in which the modification of the FW version is sensed is queried to the management server 7. Then, the operation information Ir of the type that is indicated by the query result is accumulated from the printer 3 in which the modification of the FW version is sensed. Accordingly, it is possible is to suppress occurrence of the circumstances in which it is not possible to accumulate the type of operation information Ir from the printer 3 according to the FW version after modification in a case where the FW version of the printer 3 which is connected to the LAN 91 is modified.

In addition, the operation information accumulating section 511 transmits the operation information Ir which is accumulated in this manner to the management server 7. Accordingly, it is possible to accumulate an appropriate type of operation information Ir in the management server 7 according to the FW version of the printer 3.

In addition, the printer table Tp and the operation information accumulating table Tc1 which indicate the type of operation information Ir which is to be accumulated are provided, and the operation information accumulating section 511 accumulates the operation information Ir which is indicated by the tables Tp and Tc1 from the printer 3. With this configuration, it is possible to reliably accumulate the operation information Ir of the type which is accumulated based on the tables Tp and Tc1.

In addition, when the operation information accumulating section 511 adds the query result of the management server 7 and the type of the operation information Ir which is to be accumulated, the type of the added operation information Ir is added to the operation information accumulating table Tc1. With this configuration, it is possible to add the type of the operation information Ir which is accumulated from the printer 3 by a simple process which adds the type of the operation information Ir to the operation information accumulating table Tc1.

In the embodiment in this manner, the information accumulating system 1 is equivalent to an example of the "information accumulating system" of the invention, the information mediation system 10 is equivalent to an example of the "information mediation system" of the invention, the printer 3 is equivalent to an example of the "printer" of the invention, the mediation server 5 is equivalent to an example of the "information mediation device" of the invention, the operation information accumulating section 511 is equivalent to an example of the "operation information accumulating section" of the invention, the sensing section 512 is equivalent to an example of the "specification sensing section" of the invention, the management server 7 is equivalent to an example of the "management apparatus" of the invention, the FW version is equivalent to an example of the "specifications" of the invention, the printer IP is equivalent to an example of the "object identifier" of the invention, the history table Th is equivalent to an example of the "history table" of the invention, and the printer table Tp and the operation information accumulating table Tc1 together function as an example of the "database" of the invention.

Here, the invention is not limited to the embodiments described above and it is possible to add various modifications with regard to the above description without deviating from the gist of the invention. For example, in the embodiment, the modification of the FW version is sensed as a modification of the specifications, and the target which is sensed as the specification modification is not limited thereto. Therefore, a toner color or number of toners, number of settable paper rolls, number of discharge trays, and the like that are used by the printer 3 that is connected to the LAN 91 which are modified may be configured so as to be sensed as the specification modification.

For example, the color of the ink is modified such that white ink is discharged in the discharge head which discharges ink other than white using the printing engine 351. In such a case, it is preferable to accumulate the amount of ink consumption of the white ink after modification as the operation information. Therefore, the color of ink is treated as a specification of the printer 3, and may be configured as follows. That is, the operation information accumulating section 511 records the color of ink which is used by each printer 3 in the printer table Tp. Furthermore, when the color of the ink during use by the printer 3 is acquired (step S102), the operation information accumulating section 511 collates the acquisition results in the printer table Tp (step S103). Then, step S104 and after may be executed according to the collation results.

In addition, in the embodiment, in a case where the specifications of the printer 3 which is connected to the LAN 91 are modified, the type of the operation information Ir which is to be accumulated in the printer 3 is queried to the management server 7. However, in a case where the printer 3 is newly connected to the LAN 91, the printer 3 may be configured such that the type of operation information Ir which is to be accumulated is queried to the management server 7.

That is, the sensing section 512 (connection sensing section) which is constructed in the control section 51 of the mediation server 5 senses the connection to the LAN 91 (network) of the new printer 3. In detail, the sensing section 512 appropriately executes acquisition of a serial number of each printer 3 which is connected to the LAN 91, and when a serial number which is not known is acquired, it is determined that the printer 3 with the serial number is newly connected to the LAN 91. In response to this, the operation information accumulating section 511 queries, to the management server 7, the type of the operation information Ir which is to be accumulated in the printer 3 in which the connection to the LAN 91 is sensed by the sensing section 512. Then, the operation information accumulating section 511 accumulates the operation information Ir of the type which is indicated by the query results which are received from the management server 7 from the printer 3 in which the new connection is sensed. With this configuration, even in a case where the printer 3 is newly connected to the LAN 91, it is possible to suppress occurrence of the circumstances in which it is not possible to accumulate the type of operation information Ir from the printer 3 according to the specifications of the printer 3 which is the connection target.

In addition, in the embodiment, the mediation server 5 transmits the operation information Ir to the management server 7 when the operation information Ir is accumulated from the printer 3. However, the frequency at which the operation information Ir is transmitted from the mediation server 5 to the management server 7 is not limited thereto. Therefore, the operation information accumulating section 511 of the mediation server 5 may be configured such that the operation information Ir is transmitted to the management server 7 at a lower frequency than the frequency at which the printer 3 is accessed in order to accumulate the operation information Ir. With this configuration, the operation information accumulating section 511 stores the operation information Ir which is acquired from the printer 3 in the history table Th of the memory section 55 at, for example, a frequency of approximately one time every two to three minutes, and for example, it is possible to transmit the stored operation information Ir to the management server 7 at a frequency of approximately one time every day.

In addition, as long as the user operates the management server 7, a case is assumed in which out of the accumulated various operation information Ir, it is considered that there is no need for accumulation which is barely used in management of the printer 3. Therefore, it is also possible to configure the information accumulating system 1 such that it is possible to correspond to such a case. That is, the user is able to operate the operation section 732 of the management server 7 to input an instruction that accumulation is unnecessary in the specified type of operation information Ir. The management server 7 which receives the input notifies the type of operation information Ir for which accumulation is unnecessary to the operation information accumulating section 511 of the mediation server 5. Meanwhile, when the operation information accumulating section 511 receives the notification, the type of operation information Ir for which accumulation is unnecessary is deleted from the operation information accumulating table Tc1. With this configuration, it is possible to delete the type of the operation information Ir which is accumulated from the printer 3 by a simple process which deletes the type of the operation information Ir from the operation information accumulating table Tc1.

Second Embodiment

Figure 10:
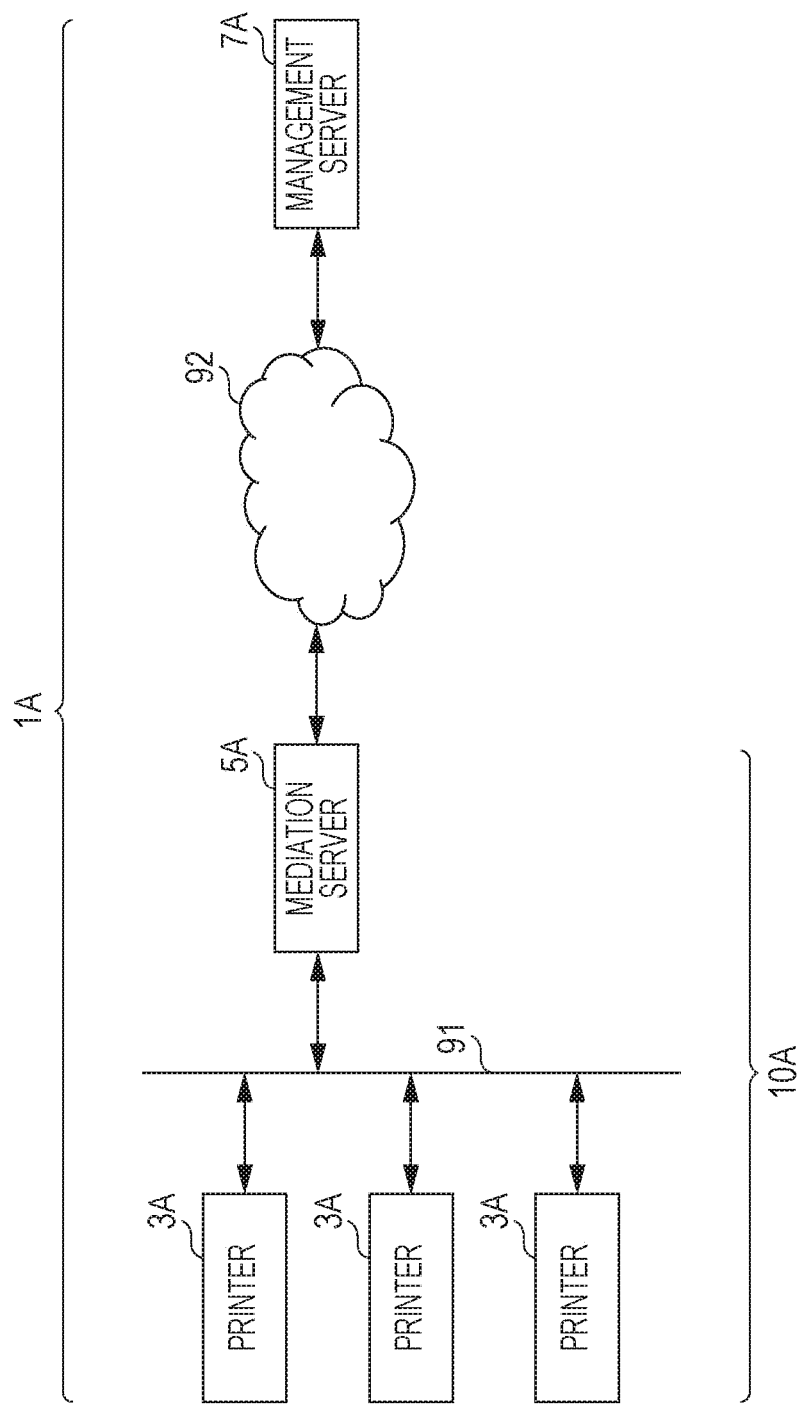
FIG. 10 is a diagram schematically illustrating an example of an information accumulating system according to a second embodiment of the invention.

FIG. 10 is a diagram schematically illustrating an example of an information accumulating system according to a second embodiment of the invention. An information accumulating system 1A according to the second embodiment accumulates operation information of a printer 3A in a management server 7A via a mediation server 5A. In the information accumulating system 1A, a plurality of printers 3A and the mediation server 5A are connected to the local area network (LAN) 91, and it is possible to communicate in both directions via the LAN 91. In addition, in the information accumulating system 1A, the mediation server 5A and the management server 7A are connected to the Internet 92, and it is possible to communicate in both directions via the Internet 92. Here, the LAN 91 and the Internet 92 are indicated as an example of a communication line, and the detailed configuration of the communication line is not limited to the connection between the printers 3A and the mediation server 5A, or the mediation server 5A and the management server 7A.

An information mediation system 10A which is configured by the plurality of printers 3A, the LAN 91, and the mediation server 5A accumulates, using the mediation server 5A, operation information of each printer 3A and transmits to an external management server 7A. For example, the mediation server 5A is constructed within a facility of the same company, and accumulates the operation information of the information accumulating system 1A which is used in the company and transmits to the management server 7A. Here, in FIG. 10, one information mediation system 10A is described, but it is also possible to configure the information accumulating system 1A by connecting a plurality of information mediation systems 10A to the management server 7A.

Figure 11:
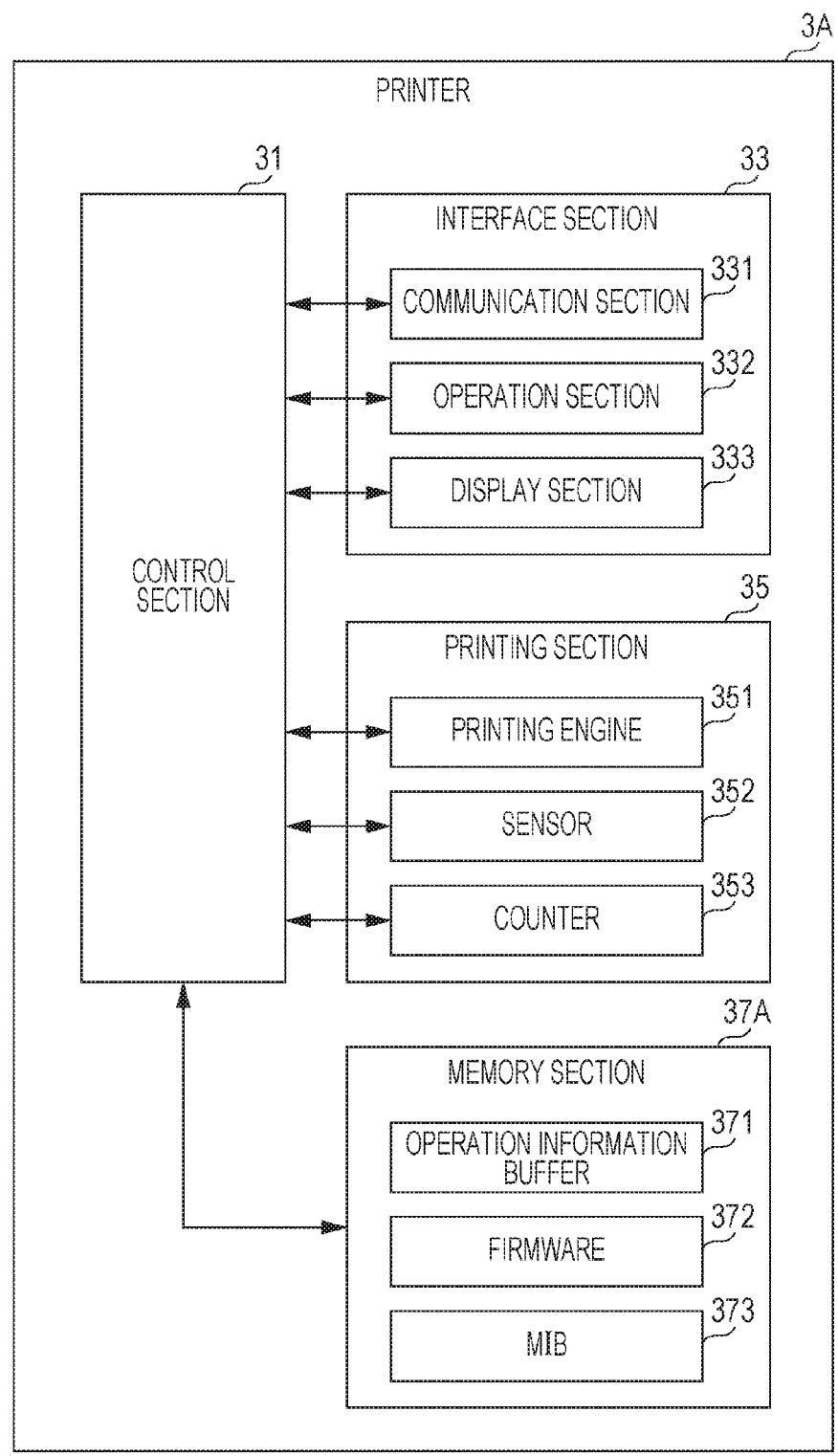
FIG. 11 is a block diagram illustrating an example of a configuration of a printer.

FIG. 11 is a block diagram illustrating an example of a configuration of the printer. The printer 3A is provided with the control section 31, the interface section 33, the printing section 35, and a memory section 37A. The control section 31 is a computer which is configured by a central processing unit (CPU) and a random access memory (RAM), and collectively controls operations which are executed by the printers 3A. Accordingly, the interface section 33, the printing section 35, and the memory section 37A operate by receiving control from the control section 31.

The interface section 33 is responsible for an interface function between the external apparatus or the user. The communication section 331 is connected to the LAN 91, and executes communication with the mediation server 5A via the LAN 91. In addition, the operation section 332 is configured by a button and the like which receives an input operation from the user, and a display section 333 is configured by a display and the like which displays various information which relates to the printer 3A to the user. Here, the operation section 332 and the display section 333 may be, for example, integrally configured by a touch panel.

The printing section 35 is provided with the printing engine 351, the sensor 352, and the counter 353. The printing engine 351 is mechanically configured to execute printing of an image on a printing medium. The printing engine 351 prints the image on the printing medium by discharging ink from a discharge head of an ink jet head type with respect to a winding-type printing medium (web) which is transported roll-to-roll. Here, the detailed configuration of the printing engine 351 is not limited to the exemplification here, and the printing engine 351 may print on a sheet-type printing medium, and may print using toner with a laser method. Then, the sensor 352 detects various physical quantities involved in an operation state of the printing engine 351, and the counter 353 counts various numerical values which change accompanying the operation of the printing engine 351.

The physical quantities which indicate the operation state of the printing engine 351 are, for example, voltage which is applied to an electrical component of the printing engine 351, temperature and humidity within the printing engine 351, a position of the discharge head or the printing medium, and the like. Then, in order to detect the physical quantities, various sensors 352 are provided such as a voltage sensor, a temperature and humidity sensor, a position sensor, and an acceleration sensor. In addition, the numerical value which changes accompanying operation of the printing engine 351 is, for example, elapsed time after power activation of the printing engine 351, cumulative length of the printed printing medium, amount of ink consumption (or a remaining amount), cumulative amount of rotation of the rotating mechanical component (for example, a roller on which the printing medium is transported), and the like. Then, various counters 353 are provided in order to count the numerical values.

The memory section 37A is configured by a storage medium of a read only memory (ROM), a hard disk drive (HDD), or a RAM, and stores data which is output from the sensor 352 and the counter 353 as operation information which indicates the operation circumstances of the printer 3A to an operation information buffer 371. FIG. 12 is a diagram schematically illustrating a storage mode for operation information in the operation information buffer of the printer, and in particular, exemplifies an operation information buffer state at each of the times Ta1, Ta2, and Ta3.

As shown in FIG. 12, the operation information buffer 371 is a storage region that is configured by addresses of a predetermined number (here, ten) which are respectively stored by the operation information. In the example in FIG. 12, at the time Ta1, operation information v1 to v10 is stored in all addresses a1 to a10 of the operation information buffer 371, and the operation information buffer 371 is full. Here, the sets of operation information v1 to v10 are acquired in chronological order, and stored in the operation information buffer 371. That is, out of all of the sets of operation information v1 to v10 which are stored in the operation information buffer 371, the operation information v1 is operation information which is stored earliest in the operation information buffer 371, and the operation information v10 is operation information which is stored latest in the operation information buffer 371.

When new operation information v11 is acquired from the time Ta1, the control section 31 writes the operation information v11 to the address a1 at which the earliest operation information v1 is stored in the operation information buffer 371 (time Ta2). Furthermore, when new operation information v12 is acquired from the time Ta2, the control section 31 writes the operation information v12 to the address a2 at which the earliest operation information v2 is stored in the operation information buffer 371 (time Ta3). That is, in the memory section 37A, the operation information buffer 371 is provided which is able to store the operation information of a predetermined amount, and the control section 31 writes the acquired operation information in order to the operation information buffer 371. In addition, in a case where there is no open capacity for writing the acquired operation information in the operation information buffer 371, the acquired operation information is overwritten on the operation information which is written earliest to the operation information buffer 371.

In addition, the memory section 37A as shown in FIG. 11, stores firmware 372 which specifies the operation of the printer 3A when printing is executed. Then, the control section 31 internally realizes each necessary function in execution of printing by reading the firmware 372 which is stored in the memory section 37A and executing the firmware 372. In detail, a function of performing rendering in which the communication section 331 receives a print job from the external apparatus is converted into print data, a function of controlling the printing engine 351 based on the print data, and the like are realized within the control section 31. Thereby, the image which is indicated by a print job is printed on the printing medium.

Furthermore, the memory section 37A stores a management information base (MIB) file 373. The MIB file 373 is implemented in the printer 3A in order to execute communication with the printer 3A and the mediation server 5A which will be described later.

Figure 13:
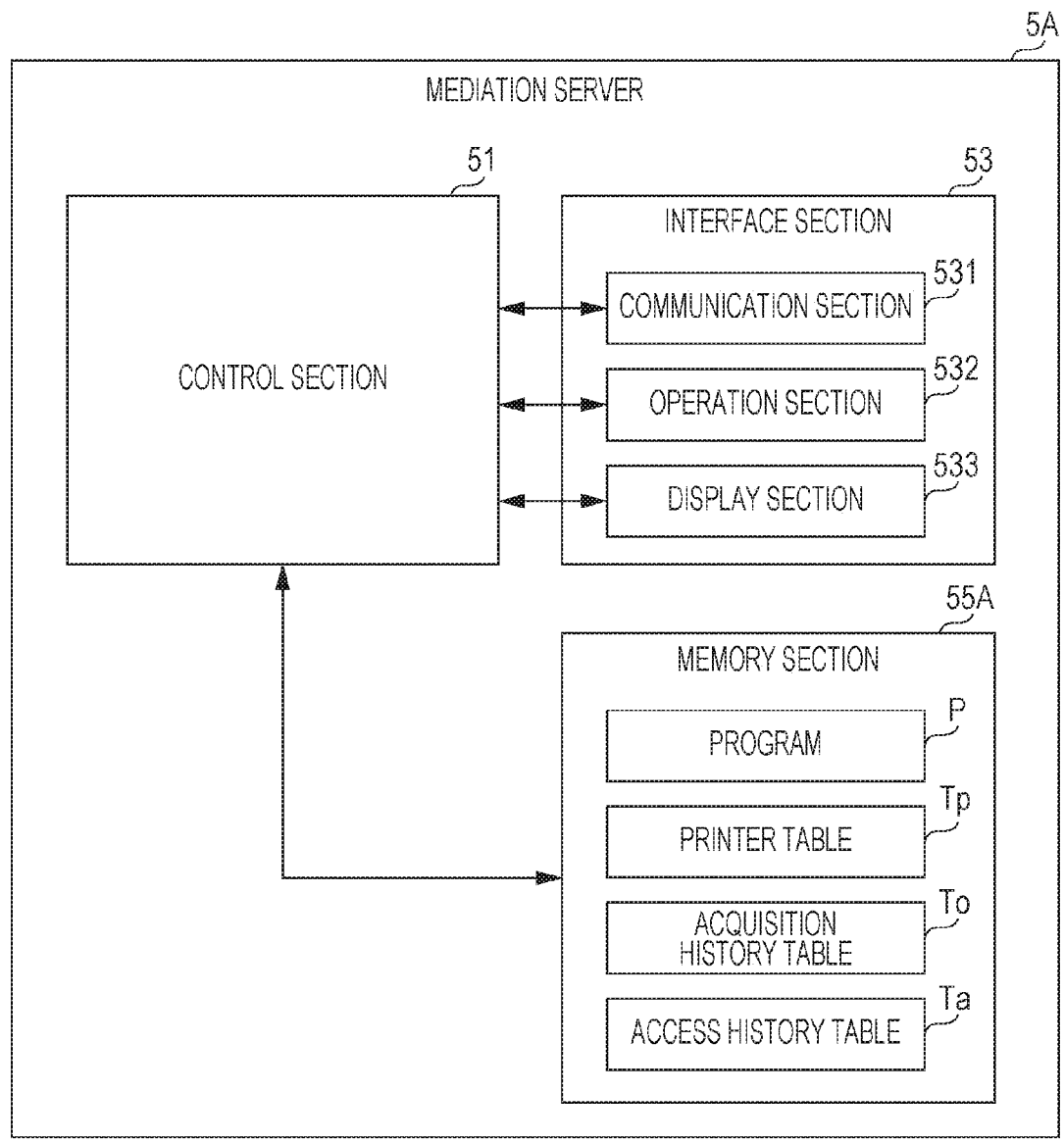
FIG. 13 is a block diagram illustrating an example of a configuration of the mediation server.

FIG. 13 is a block diagram illustrating an example of a configuration of the mediation server. The mediation server 5A is provided with the control section 51, the interface section 53, and a memory section 55A, accumulates the operation information by accessing the operation information buffer 371 of the memory section 37A of each of the plurality printers 3A, and executing the information mediation operation in which the accumulated operation information is transmitted on the management server 7A. The control section 51 is a computer which is configured by a CPU and a RAM, and the information mediation operation is mainly executed while using the interface section 53 and the memory section 55A.

The interface section 53 is responsible for an interface function between the external apparatus or the user. The communication section 531 is connected to the LAN 91 and the Internet 92, and executes communication with the management server 7A via the Internet 92 while executing communication with each printer 3A via the LAN 91. In addition, an operation section 532 is configured by a mouse, a keyboard, and the like which receives the input operation from the user, and a display section 533 is configured by a display and the like which display various information to the user. Here, the operation section 532 and the display section 533 may be, for example, integrally configured by a touch panel.

The memory section 55A is configured by the storage medium of a ROM, HDD, or RAM, and stores the program P which specifies the information mediation operation. Then, the control section 51 executes the information mediation operation by working together with the memory section 55A in the following manner by executing the program P which is read from the memory section 55A.

The printer table Tp is stored in the memory section 55A. The printer table Tp is a table in which information is stored which relates to each printer 3A that is connected to the mediation server 5A, for example, an Internet protocol (IP) address of each printer 3A (hereinafter referred to as "printer IP") is recorded in advance due to the input operation of the user. Then, the control section 51 acquires the operation information from the target printer 3A by accessing the printer 3A based on the printer IP.

Here, communication between the mediation server 5A and the printer 3A is executed using a simple network management protocol (SNMP). That is, in the mediation server 5A which is a manager, SNMP manager software is operated, and in the printer 3A which is an agent, SNMP agent software is operated. As described above. In the printer 3A, the MIB file 373 is implemented in the printer 3A, and the mediation server 5A acquires an MIB tree (MIB structure) of each printer 3A using, for example, using an snmpwalk command. Then, the mediation server 5A acquires an object identifier of target information which references the MIB tree, and issues an acquisition command with respect to the object identifier to the printer 3A. Meanwhile, the printer 3A which receives the acquisition command returns the target information which corresponds to the object identifier of the acquisition command to the mediation server 5A. On the mediation server 5A set in this manner, the printer 3A acquires the target information from the address of the memory section 37A which stores the target information.

Accordingly, the control section 51 of the mediation server 5A is able to acquire the operation information which is stored in the operation information buffer 371 of the printer 3A by issuing the object identifier which corresponds to the operation information to the printer 3A. In this manner, it is possible to acquire the operation information which is stored in the operation information buffer 371 in order at an interval of a predetermined number by repeating an operation in which the operation information (for example, all operation information) of an earliest predetermined number that is recorded in the operation information buffer 371 at a predetermined frequency. Then, the control section 51 records and stores the acquired operation information in the acquired history table To. Here, the mediation server 5A is provided which the acquired history table To for each printer 3A in order to accumulate the operation information in each of the plurality of printers 3A.

FIG. 14 is a diagram schematically illustrating a recording mode of the operation information in the acquired history table of the mediation server, and in particular, exemplifies a state of the acquired history table after acquisition in each case in which the operation information of ten sets is newly acquired at times Tb1, Tb2, and Tb3 at which the elapsed times from the acquisition of the operation information in the previous time are different. Here, the times at which the operation information is acquired in the previous time are the same in each case. In addition, in FIG. 14, the ten latest sets of operation information are which are recorded in the acquired history table To are indicated, but it is possible for the acquired history table To to record more than ten sets of operation information.

In the case in which the operation information is acquired at the time Tb1, when comparing the ten sets of the new operation information before acquisition and after acquisition, the earliest operation information v10 out of the newly acquired ten sets of operation information v11 to v19, and v10 matches the operation information v10 which is recorded in the operation information buffer 371 before acquisition. That is, during the current acquisition time Tb1 from the previous acquisition time, nine sets of operation information v11 to v19 are newly written by the operation information buffer 371 of the printer 3A, and accompanying this, the operation information v1 to v9 is deleted. Meanwhile, the operation information v10 is not written and remains. For this reason, the operation information v10 is acquired in both the previous time and the current time, and recorded in the operation information buffer 371. Here, as long as a difference of previous operation information and the operation information which is newly acquired is compared, all of the operation information in which the operation information buffer 371, in which the previous operation information is recorded, is newly acquired may be overwritten. In that case, in an example of the acquisition time Tb1, the operation information v10 is also overwritten.

In the case in which the operation information is acquired at the time Tb2 which is later than the time Tb1, when comparing the ten sets of the latest operation information before acquisition and after acquisition, none of the newly acquired ten sets of operation information v11 to v20 matches the operation information v1 to v10 which is recorded in the operation information buffer 371 before acquisition. That is, during the current acquisition time Tb2 from the previous acquisition time, ten sets of operation information v11 to v20 are newly written by the operation information buffer 371 of the printer 3A, and accompanying this, the operation information v1 to v10 is deleted. For this reason, there is no operation information which is acquired both at the previous time and the current time.

In the case in which the operation information is acquired at a time Tb3 which is later than the time Tb2, when comparing the ten sets of the latest operation information before acquisition and after acquisition, none of the newly acquired ten sets of operation information v21, and v12 to v20 matches the operation information v1 to v10 which is recorded in the operation information buffer 371 before acquisition. Moreover, the operation information v11 which is to be stored between the operation information v10 and v12 in the operation information buffer 371 of the printer 3A is not present among the newly acquired ten sets of operation information v21, and v12 to v20. This is for the following reason.

That is, during the current acquisition time Tb3 from the previous acquisition time, eleven sets of operation information v11 to v21 are newly written by the operation information buffer 371 of the printer 3A. In this manner, in the operation information buffer 371, the earliest operation information v11 is deleted by overwriting the latest operation information v21 since a plurality of sets of operation information v11 to v21 which is greater than a largest stored plurality (ten) of the operation information in the operation information buffer 371 is overwritten. For this reason, not only is the operation information which is acquired at both of the previous time and at the current time not present, but dropping of the operation information v11 occurs.

Therefore, when the frequency at which the operation information is acquired from the operation information buffer 371 of the printer 3A is low due to the mediation server 5A accessing the printer 3A, it is determined that it is possible that dropping of the operation information occurs. In other words, to a certain extent, it is necessary to increase the frequency at which the mediation server 5A accesses the printer 3A in order to control the occurrence of dropping of the operation information and reduce accumulation leakage of the operation information. Therefore, as will be described later, the control section 51 of the mediation server 5A determines the frequency at which each printer 3A is accessed for each printer 3A. In addition, as shown in FIG. 13, on the mediation server 5A, an access history table Ta is stored in the memory section 55A, the control section 51 records the time at which each printer 3A is accessed in the access history table Ta. Here, the access history table Ta is provided for each printer 3A in order to access each of the plurality of printers 3A on the mediation server 5A.

Figure 15:
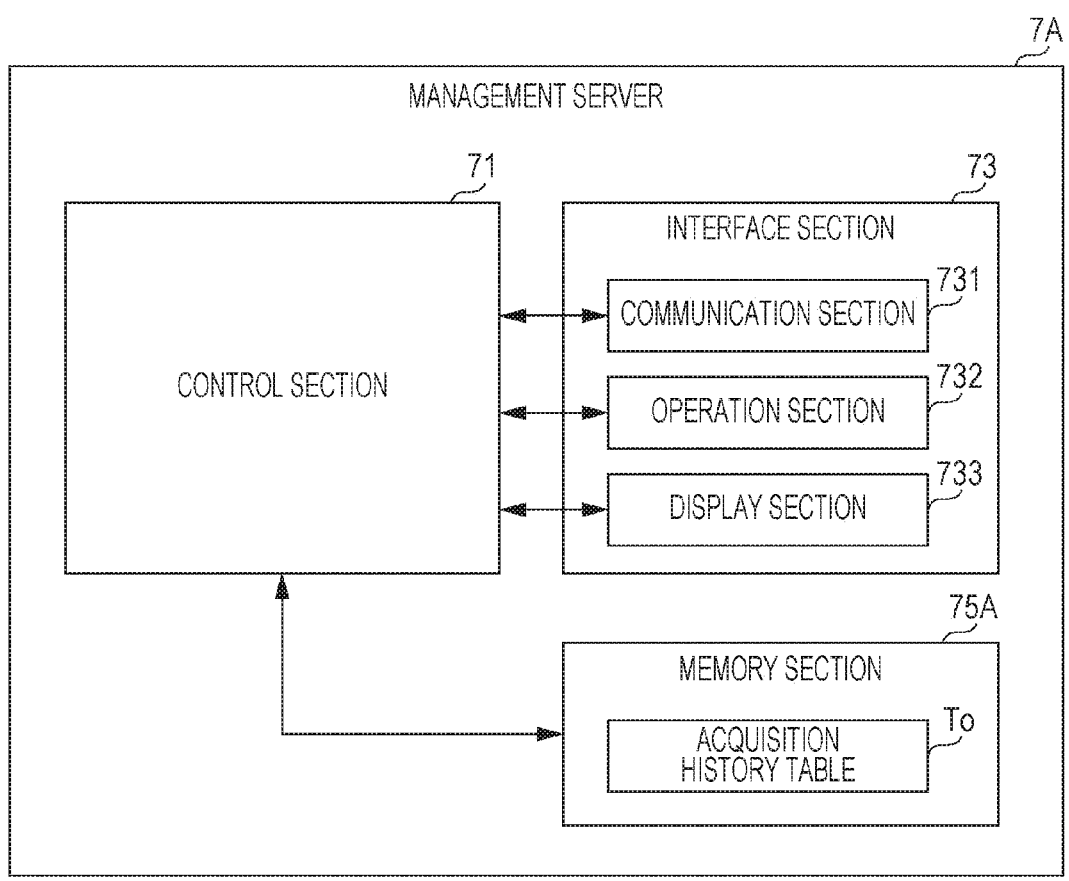
FIG. 15 is a block diagram illustrating an example of a configuration of the management server.

FIG. 15 is a block diagram illustrating an example of a configuration of the management server. The management server 7A is provided with the control section 71, the interface section 73 and a memory section 75A, receives the operation information which is accumulated by the mediation server 5A, and responds to the query from the mediation server 5A. The control section 71 is a computer which is configured by a CPU and a RAM. The control section 71 executes a predetermined operation such as controlling the printing operation of each of the printers 3A via the mediation server 5A based on, for example, the accumulated operation information while using the interface section 73 and the memory section 75A.

The interface section 73 is responsible for an interface function between the external apparatus or the user. The communication section 731 is connected to the Internet 92, and executes communication with the mediation server 5A via the Internet 92. In addition, an operation section 732 is configured by a mouse, a keyboard, and the like which receives the input operation from the user, and a display section 733 is configured by a display and the like which displays various information to the user. Here, the operation section 732 and the display section 733 may be, for example, integrally configured by a touch panel.

The memory section 75A is configured by the storage medium which is a ROM, HDD, or RAM. The acquired history table To is stored in the memory section 75A. The acquired history table To is equipped with the same configuration as the acquired history table To described above basically, and the operation information which is transmitted from the mediation server 5A is recorded.

Here, as described using FIG. 14, in the information mediation operation of the mediation server 5A, there is a concern that when the access frequency to the printer 3A is low, dropping of the operation information occurs. Therefore, the mediation server 5A of the embodiment, sets the frequency at which the printer 3A is accessed (in other words, an interval of access) for each printer 3A. That is, the higher an operation frequency of the printer the more frequent the access.

First, the mediation server 5A confirms the type of the MIB file 373 of the printer 3A prior to setting the access frequency of the printer 3A. That is, as described above, communication of the mediation server 5A and the printer 3A is executed based on the MIB file 373 (hereinafter referred to as "MIB" as appropriate) which is implemented in the printer 3A. In the MIB, there are two types of a reference MIB and an expanded MIB (private MIB). In particular, the expanded MIB of the embodiment indicates a storage address which is not indicated in the reference MIB out of the storage addresses of each type of operation information that is accumulated by the information mediation operation, and for example, and is implemented by the maker of the printer 3A at a factory or the like of the printer 3A. Out of the MIB, the reference MIB is implemented in all of the printers 3A, but the expanded MIB is not necessarily limited to being implemented in all printers 3A. Therefore, the mediation server 5A executes confirmation of the MIB.

Figure 16:
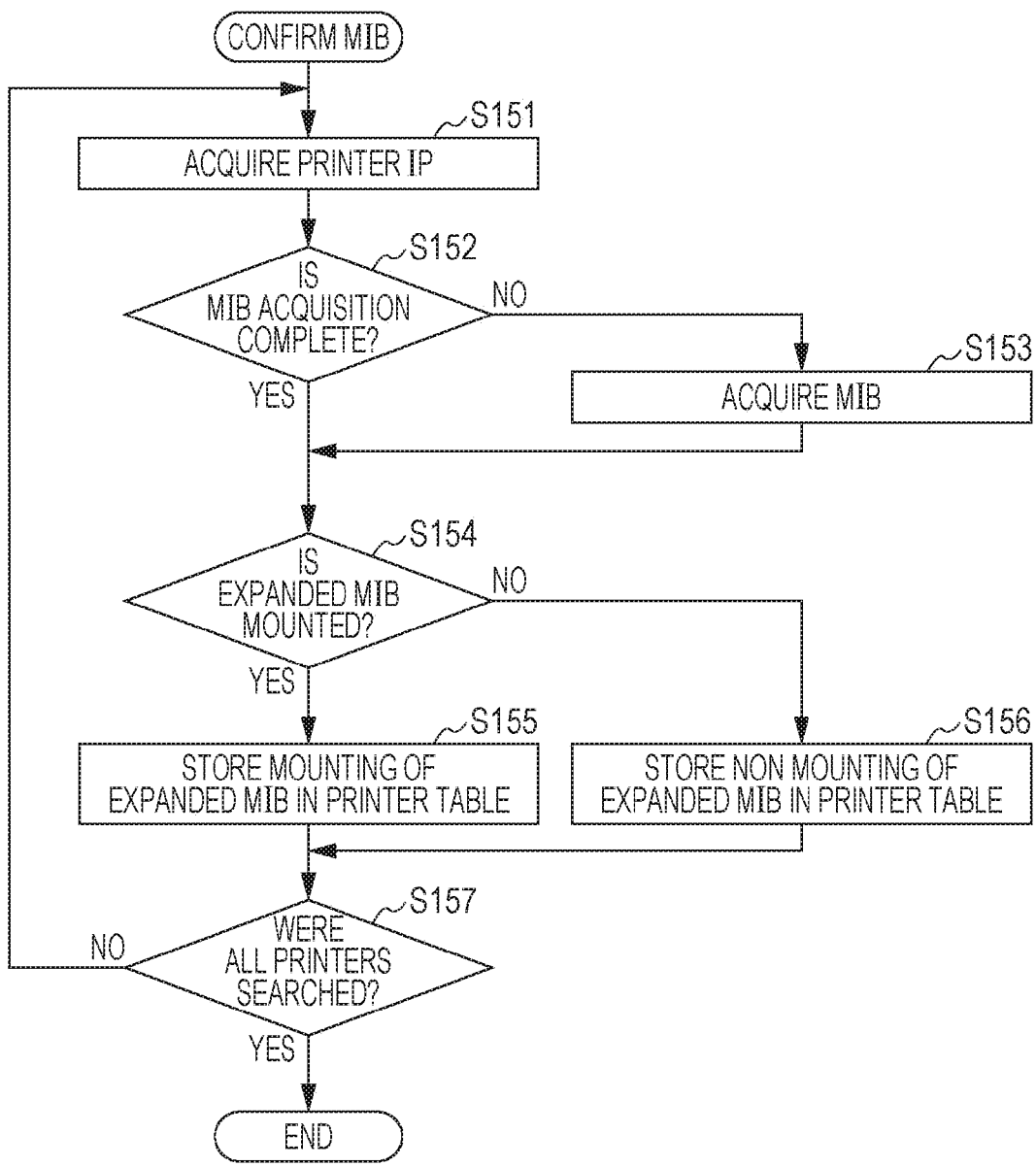
FIG. 16 is a flow chart illustrating an MIB confirmation operation of the printer.

FIG. 16 is a flow chart illustrating an MIB confirmation operation of the printer. The flow chart in FIG. 16 is executed using the control section 51 based on the program P. In step S151, the printer IP of the printer 3A which is the confirmation target is acquired by accessing the printer table Tp of the memory section 55A. Furthermore, it is determined whether or not acquisition of the MIB tree in the printer 3A is complete by referring to the stored contents of the printer table Tp (step S152). In a case where acquisition of the MIB tree is complete (the case of "YES" in step S152), the process proceeds to step S154 without change, then in a case where the MIB tree is not acquired (the case of "NO" in step S152), the MIB tree is acquired in step S153, then the process proceeds to step S154.

In step S154, it is determined whether or not the expanded MIB is implemented in the printer 3A based on the MIB tree which is acquired from the printer 3A. Then, in a case where the expanded MIB is implemented (the case of "YES" in step S154), the instruction is recorded in the printer table Tp (step S155), and in a case where the expanded MIB is not implemented (the case of "NO" in step S154), the instruction is recorded in the printer table Tp (step S156). In step S157, it is determined whether or not all printers 3A which are connected to the mediation server 5A are searched. In a case where the printer 3A is not searched (the case of "NO" in step S157), the process returns to step S151, and steps S151 to S156 are executed in another printer 3A. Meanwhile, in a case where searching of all printers 3A is complete (the case of "YES" in step S157), the flow chart in FIG. 16 ends. In this manner, it is recorded in the printer table Tp whether only the reference MIB is implemented, or whether both of the reference MIB and the expanded MIB are implemented by confirming each printer 3A.

In this manner, the type of the MIB which is mounted in the printer 3A is confirmed for the following reasons. That is, the printer 3A in which the expanded MIB is implemented is designed to optimize the information mediation operation using the mediation server 5A, and there is a large possibility that the capacity of the operation information buffer 371 which stores the operation information is high. For this reason, there is a low possibility that dropping of the operation information described above occurs even if the frequency at which the printer 3A is accessed from the mediation server 5A is low. In contrast to this, the printer 3A in which the expanded MIB is not implemented is not necessarily designed to optimize the information mediation operation using the mediation server 5A, and there is a small possibility that the capacity of the operation information buffer 371 which stores the operation information is high. For this reason, there is a high possibility that dropping of the operation information described above occurs when the frequency at which the printer 3A is accessed from the mediation server 5A is low. Therefore, the type of the MIB is confirmed in order to reference the type of the MIB which is implemented in the printer 3A in determining the access frequency which will be described later. That is, in relation to the printer in which the possibility is high that the capacity of the operation information buffer 371 is small, the more frequency at which the operation information is accumulated is increased the more it is possible to reduce accumulation leakage of the operation information.

Figure 17:
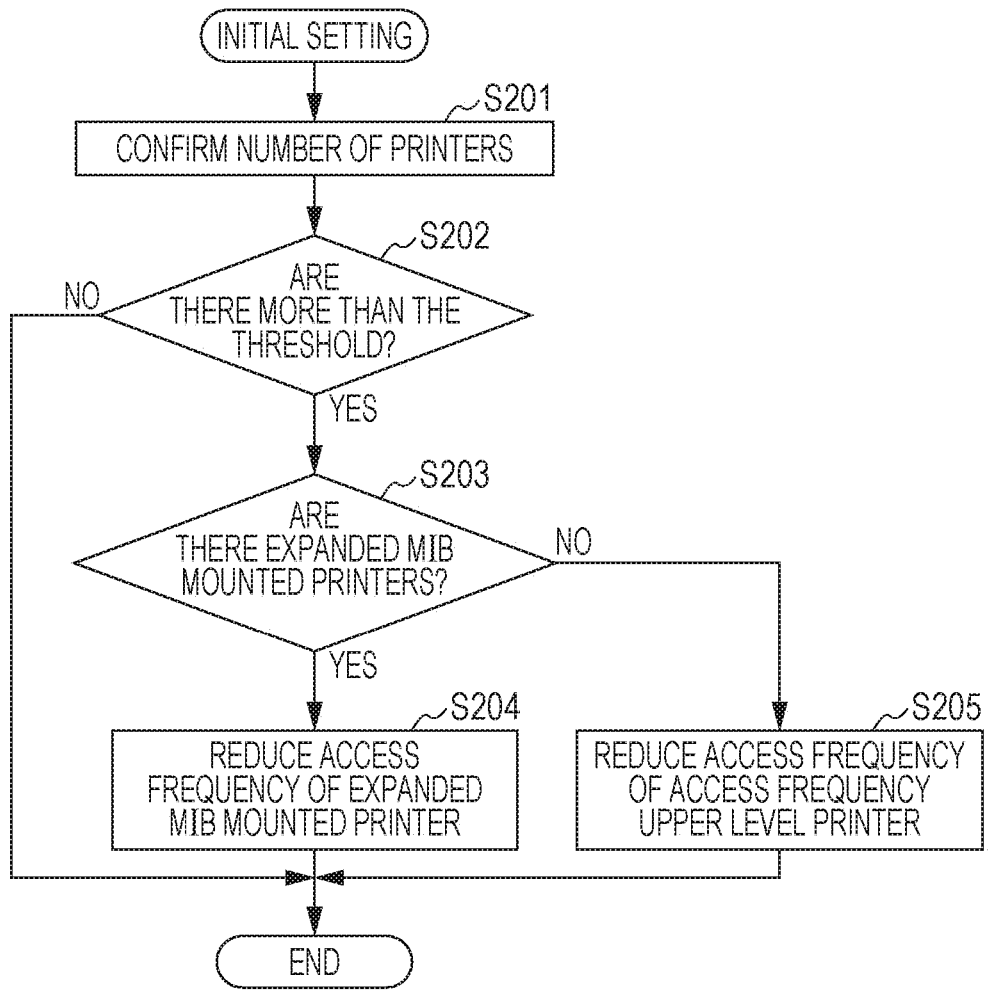
FIG. 17 is a flow chart illustrating an initial setting operation of an access frequency to the printer.

FIG. 17 is a flow chart illustrating an initial setting operation of the access frequency of the printer. The flow chart in FIG. 17 is executed using the control section 51 based on the program P. In step S201, the number of printers 3A which are connected to the mediation server 5A is confirmed. In step S202, it is determined whether or not the confirmed number of printers 3A is greater than a threshold value (for example, 100). Here, the threshold number is set in advance by the user using the operation section 532, and is stored in the memory section 55A. Then, in a case where the number of printers 3A is the threshold value or less (the case of "NO" in step S202), the flow chart in FIG. 17 is complete without modifying the set value of the access frequency of each printer 3A from the current state.

Meanwhile, in a case where the number of printers 3A is greater than the threshold value (the case of "YES" in step S202), step S203 and after are executed in order to reduce the load on the mediation server 5A which accesses each printer 3A. In step S203, out of the printers 3A which are connected to the mediation server 5A, it is confirmed whether or not the printer 3A is present in which the expanded MIB is implemented. In a case where the printer 3A is present in which the expanded MIB is implemented (the case of "YES" in step S203), the set value of the access frequency to the printer 3A in which the expanded MIB is implemented lowers (step S204) and the flow chart in FIG. 17 ends. Here, as described above, the capacity of the operation information buffer 371 which has the printer 3A increases since it is possible to estimate that there is room to lower the access frequency to the printer 3A. Meanwhile, in a case where there is no printer 3A in which the expanded MIB is implemented (the case of "NO" in step S203), the set value of the access frequency of the printer 3A in which the access frequency is an upper level (for example, an upper level of ten printers 3A) lowers (step S205), and the flow chart in FIG. 17 ends.

In this manner, when initial setting ends, the mediation server 5A accumulates the operation information from each printer 3A by accessing each printer 3A at a set frequency. In addition, the access frequency to each printer 3A is modified as appropriate while executing accumulation of the operation information. Here, the access frequency is equivalent to the number of times the printer 3A is accessed in a predetermined unit of time. Accordingly, the access frequency increasing is equivalent to increasing the number of times that the printer 3A is accessed in a unit of time (in other words, the interval at which the printer 3A is accessed is shortened), and the access frequency lowering is equivalent to a reduction of the number of times the printer 3A is accessed in a predetermined time (in other words, the interval at which the printer 3A is accessed is lengthened).

Figure 18:
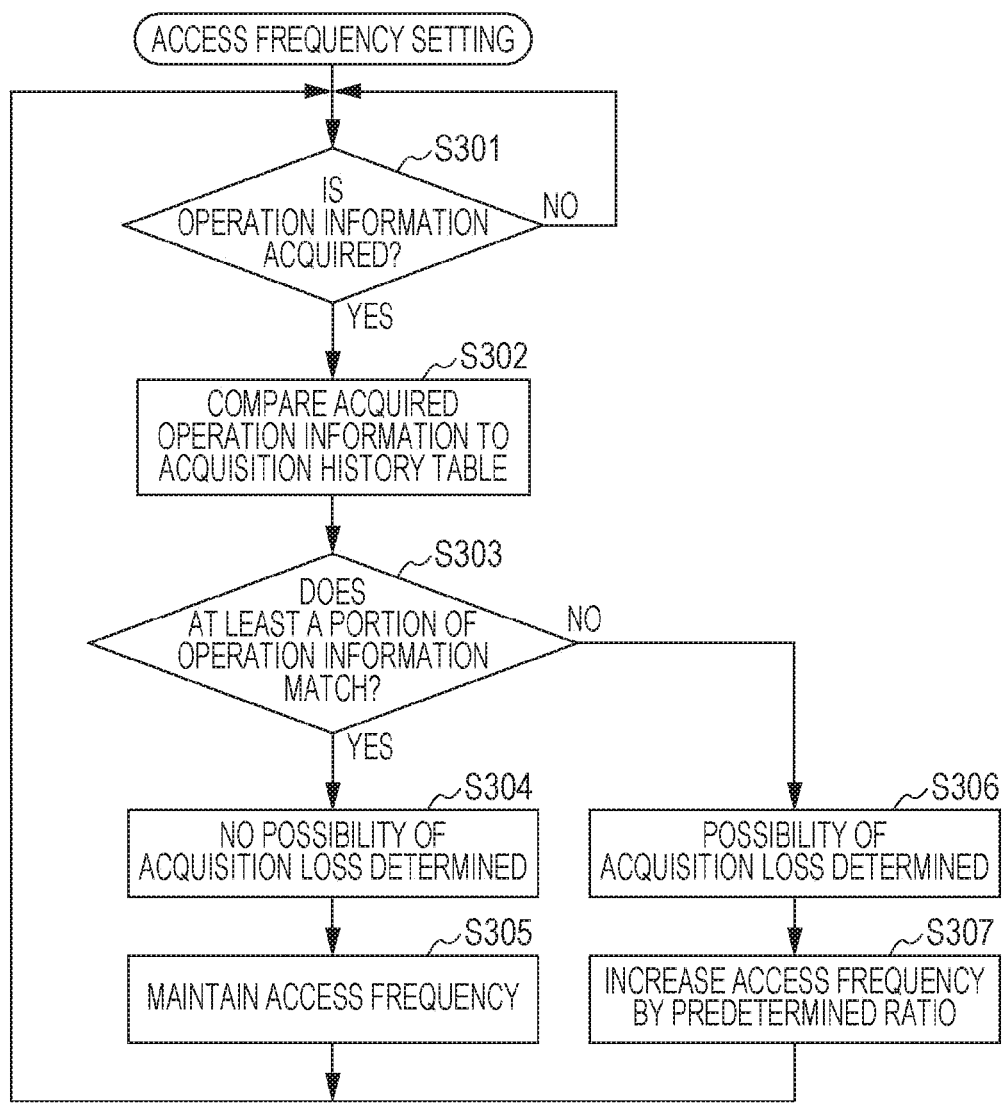
FIG. 18 is a flow chart illustrating a setting operation of the access frequency to the printer.

FIG. 18 is a flow chart illustrating a setting operation of the access frequency to the printer which is executed in parallel to accumulation of the operation information from the printer. The flow chart in FIG. 18 is executed using the control section 51 based on the program P. In step S301, it is confirmed whether or not the operation information is acquired from the printer 3A. Then, when it is confirmed that the operation information is acquired ("YES" in step S301), the acquired operation information and the operation information which is recorded in the acquired history table To of the printer 3A that is the acquisition target of the operation information are compared. That is, the operation information which is acquired in the past from the printer 3A for which the operation information is acquired in step S301, and the operation information which is acquired currently in step S301 are compared.

In detail, when the number of sets of operation information which is accumulated at the current time is set to N (N is an integer equal to or more than 1), it is determined whether or not at least some of N latest sets of operation information out of the operation information which is recorded in the acquired history table To prior to acquisition of the operation information and N sets of operation information which is acquired at the current time match. Furthermore, it is determined whether or not the earliest operation information out of the N sets of operation information which are acquired at the current time is present out of the latest N sets of operation information of the acquired history table To prior to acquisition of the operation information.

A case where in the result of the comparison in step S302, at least a portion of the operation information matches (the case of "YES" in step S303) is equivalent to acquisition circumstances of the operation information that is exemplified in "Tb1" in FIG. 14, and it is determined that there is no possibility of acquisition leakage of the operation information (dropping) (step S304). Then, it is determined that the set value of the access frequency to the printer 3A is maintained (step S305).

Meanwhile, a case where in the result of the comparison in step S302, none of the operation information matches (the case of "NO" in step S303) is equivalent to acquisition circumstances of the operation information that are exemplified in "Tb2" or "Tb3" in FIG. 14. There is no acquisition leakage of the operation information in the case of the former, but acquisition leakage of the operation information occurs in the case of the latter. Accordingly, in this case, it is determined that there is a possibility of acquisition leakage of the operation information (step S306). Then, the access frequency to the printer 3A increases at a predetermined proportion (for example, double) (step S307). Here, the proportion at which the access frequency increases is set in advance by the user using the operation section 532, and is stored in the memory section 55A.

In the embodiment as described above, the mediation server 5A which is able to communicate with the plurality of printers 3A accesses the printer 3A in order to accumulate the operation information which is modified according to the operation of the printer 3A from the printer 3A. Moreover, the timing of the access is determined for each printer 3A. Accordingly, it is possible to accumulate the operation information from each printer 3A by respectively accessing the plurality of printers 3A at appropriate timings.

In addition, the timing at which the printer 3A is accessed is determined for each printer 3A based on a determination result of presence or absence of a possibility that accumulation leakage of the operation information from the printer 3A to the mediation server 5A occurs. At this time, the operation information which is acquired by the mediation server 5A is recorded in the acquired history table To. Then, the presence or absence of a possibility that accumulation leakage of the operation information from the printer 3A is determined based on the result in which the operation information which is accumulated by accessing the printer 3A and the operation information which is recorded in the acquired history table To are compared. Thereby, it is possible to ascertain the presence or absence of the possibility of accumulation leakage (loss) of the operation information in the accumulation of the operation information.

In addition, the frequency at which the printer 3A, for which it is determined that there is a possibility that accumulation leakage of the operation information occurs, is accessed is increased. Thereby, it is possible to suppress the occurrence of accumulation leakage of the operation information.

In addition, the number of the plurality of printers 3A which the mediation server 5A is able to communicate with is confirmed. Then, in a case where the confirmed number of printers 3A is greater than the threshold value, the frequency at which the predetermined printer 3A out of the plurality of printers 3A is accessed lowers. Thereby, even in a case where the number of printers 3A that it is possible to communicate with is great, it is possible to suppress the load which is applied to the mediation server 5A.

In this manner, in the embodiment, the printer 3A is equivalent to an example of the "printer" of the invention, the mediation server 5A is equivalent to an example of the "information accumulating device" of the invention, and the acquired history table To is equivalent to an example of the "acquired history table" of the invention.

Figure 19:
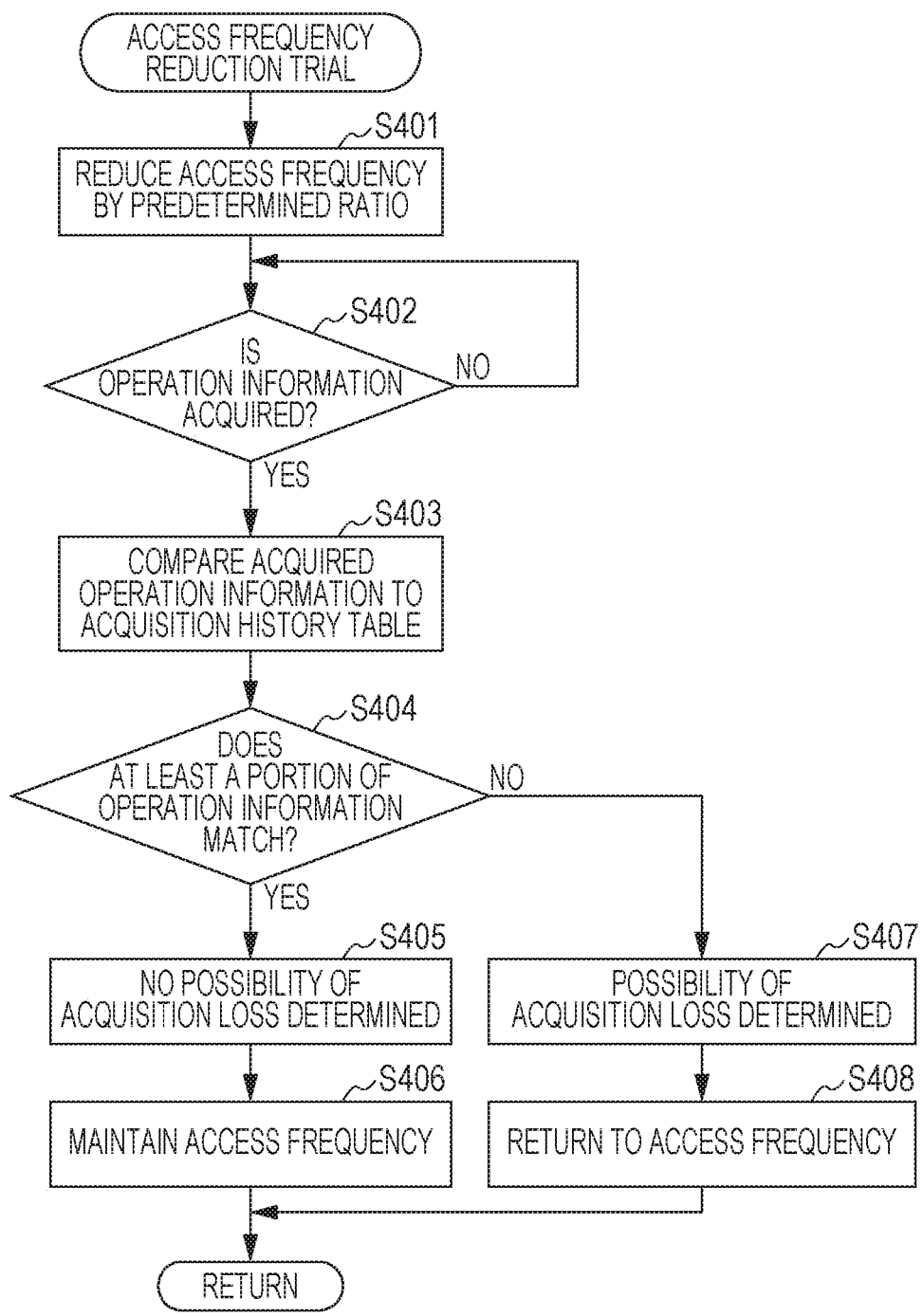
FIG. 19 is a flow chart illustrating a reduction trial operation of the access frequency to the printer.

Here, the invention is not limited to the embodiments described above, and it is possible to add various modifications with regard to the above description without deviating from the gist of the invention. Therefore, for example, the flow chart in FIG. 19 may be executed which is a trial to reduce the access frequency to the printer 3A in parallel to accumulation of the operation information from the printer. Here, FIG. 19 is a flow chart illustrating a reduction trial operation of the access frequency of the printer. The flow chart in FIG. 19 is executed using the control section 51 based on the program P.

In step S401, the access frequency to the printer 3A which is a trial target is lowered by a predetermined proportion (for example, half). Here, the proportion at which the access frequency lowers is set in advance by the user using the operation section 532, and is stored in the memory section 55A. In step S402, it is confirmed whether or not the operation information is acquired from the printer 3A. Then, when it is confirmed that the operation information is acquired ("YES" in step S402), the acquired operation information and the operation information which is recorded in the acquired history table To of the printer 3A that is the acquisition target of the operation information are compared (step S403). The comparison is executed in the same manner as in step S302 described above.

A case where in the result of the comparison in step S403, at least a portion of the operation information matches (the case of "YES" in step S404) is equivalent to acquisition circumstances of the operation information that are exemplified in "Tb1" in FIG. 14, and it is determined that there is no possibility of acquisition leakage of the operation information (dropping) (step S405). Then, it is determined that the set value of the access frequency to the printer 3A is maintained (step S406). That is, it is determined that the access frequency to the printer 3A of the trial target is lowered.

Meanwhile, in a case where in the result of the comparison in step S403, none of the operation information matches (the case of "NO" in step S404) is equivalent to acquisition circumstances of the operation information that are exemplified in "Tb2" or "Tb3" in FIG. 14. There is no acquisition leakage of the operation information in the case of the former, but acquisition leakage of the operation information occurs in the case of the latter. Accordingly, in this case, it is determined that there is a possibility of acquisition leakage of the operation information (step S407). Then, the set value of the access frequency to the printer 3A returns to the value before execution of step S401 (step S408). That is, it is determined that the access frequency to the printer 3A of the trial target is not lowered.

In the configuration which is shown in FIG. 19, the frequency at which the printer 3A, for which it is determined that there is no possibility that accumulation leakage of the operation information occurs, is accessed lowers. Thereby, it is possible to suppress the load which is applied to the mediation server 5A.

That is, the proportion at which the access frequency lowers may be set with reference to the access history table Ta and not set by the user. That is, in the access history table Ta, the access history to the printer 3A from the mediation server 5A is recorded. Accordingly, it is possible to ascertain a transition of the frequency at which the printer 3A is accessed by the mediation server 5A without referencing the access history table Ta. Therefore, in step S401, there may be a configuration such that, during the predetermined time (for example, three months in the past), the lowest access frequency is determined from the acquired history table To, and the access frequency is lowered until the lowest access frequency. With this configuration, actual past results are referenced when the access frequency to the printer 3A is lowered. For this reason, it is possible to lower the access frequency to the printer 3A while suppressing occurrence of accumulation leakage of the operation information.

The entire disclosure of Japanese Patent Application No. 2015-010970, filed Jan. 23, 2015 and 2015-010972, filed Jan. 23, 2015 are expressly incorporated by reference herein.

What is claimed is:

1. An information mediation system comprising:
a printer; and
an information mediation server configured to accumulate operation information from the printer,
wherein the information mediation server comprises:
a datastore storing one or more printer specifications for the printer and corresponding one or more categories of operation information to be collected from the printer;
an operation information accumulating section configured to collect operation information falling within the one or more categories from the printer, and
a specification detecting section configured to detect a modification in specifications of the printer, and
wherein the operation information accumulating section is configured to (i) request, to an external management apparatus responsive to the specification detecting section detecting a modification in the specifications of the printer, an update to the one or more categories of operation information to be collected from the printer, (ii) update the one or more categories stored in the datastore according a response to the request, and (iii) accumulate operation information falling within the updated one or more categories from the printer.

2. The information mediation system according to claim 1,
wherein the operation information accumulating section is configured to collect the operation information via a network from the printer which is connected to the network,
the information mediation server includes a connection sensing section configured to detect that the printer is connected to the network, and the operation information accumulating section is configured to request the update to the categories of operation information to be collected responsive to the specification detecting section detecting a modification in the specifications of the printer and to detecting that the printer is connected to the network.

3. The information mediation system according to claim 1,
wherein the operation information accumulating section is configured to transmit the collected operation information to the management apparatus.

4. The information mediation system according to claim 3,
wherein the operation information accumulating section is configured to transmit the operation information to the management apparatus at a lower frequency than a frequency at which the printer is accessed for collecting the operation information.

5. The information mediation system according to claim 4,
wherein the operation information accumulating section is configured to store the operation information in a history table by associating an identifier which identifies the printer in which the operation information is collected and an acquired date and time at which the operation information is collected.

6. The information mediation system according to claim 5,
wherein the operation information acquiring section is configured to record newly collected operation information only when the collected operation information differs from previously collected operation information stored in the recorded history table.

7. The information mediation system according to claim 6,
wherein the operation information acquiring section is configured such that, responsive to determining that the newly collected operation information and the previously collected operation information differ, the operation information acquiring section transmits the collected operation information to the management apparatus, and responsive to determining that the newly collected operation information and the previously collected operation information match, the operation information acquiring section does not transmit the collected operation information to the management apparatus.

8. The information mediation system according to claim 1,
wherein updating the one or more categories of operation information stored in the datastore comprises deleting a category of operation information identified as unnecessary in the response received from the external management apparatus.

9. An information mediation method comprising:
sensing, by an information mediation server, modification of specifications of a printer which is connected to the information mediation server via a network;
requesting, by the information mediation server from a management apparatus; responsive to detecting modification of specifications of the printer, an update to a set of categories of operation information that is to be collected from the printer;
receiving, by the information mediation server, an update to the set of categories of operation information to be collected;
collecting, by the information mediation server, operation information falling within the categories of the updated set of categories from the printer.

10. An information accumulating system comprising:
a printer;
an information mediation server configured to collect operation information from the printer; and
a management apparatus configured to store categories of operation information that is to be collected from the printer, the categories associated with printer specifications;
wherein the information mediation server includes
an operation information accumulating section configured to determine one or more categories of operation information to collect based on printer specifications, and to collect operation information falling within the determined one or more categories of operation information from the printer, and a specification sensing section configured to detect a modification in specifications of the printer, and the operation information accumulating section is configured to request and receive, from the management apparatus, an update to the categories of operation information that is to be collected from the printer responsive to detection of a modification of the specifications of the printer by the specification sensing section, and to collect operation information falling within the updated categories of operation information to collect, from the printer wherein the operation information accumulating section is configured to transmit the operation information to the management apparatus at a lower frequency than a frequency at which the printer is accessed for collecting the operation information.

11. An information processing method comprising:

identifying, for at least one printer by an information accumulating device, timing data in a datastore corresponding to a frequency at which the information accumulating device is set to the printer in order to collect operation information;

collecting, by the information accumulating device in a collection operation, a predetermined number of sets of operation information from an operation information buffer of the printer that overwrites oldest stored operation information when the buffer is full and new operation information is to be recorded;

determining, by the information accumulating device, whether and/or how many sets of operation information of the collected sets of operation information match any of the sets of operation information collected in a previous collection operation; and modifying, by the information accumulating device, the timing data to alter the frequency at which the information accumulating device accesses the printer to collect operation information, responsive to the determination.

12. The information processing method according to claim 11, wherein the information accumulating section determines that no sets of operation information of the collected sets of operation information match any of the sets of operation information collected in a previous collection operation; and the information accumulating device modifies the timing data to increase the frequency at which the information accumulating device accesses the printer to collect operation information, responsive to the determination.

13. The information processing method according to claim 12, wherein the information accumulating section determines that at least one set of operation information of the collected sets of operation information matches at least one of the sets of operation information collected in a previous collection operation; and the information accumulating device modifies the timing data to decrease the frequency at which the information accumulating device accesses the printer to collect operation information, responsive to the determination.

14. The information processing method according to claim 13, further comprising:

determining the number of the plurality of printers with which the information accumulating device is able to communicate, and modifying the timing data to lower the frequency at which a predetermined printer is accessed out of the plurality of printers in a case where the number of confirmed printers is greater than a threshold number.

15. The information processing method according to claim 14, wherein the information processing device collects the operation information from the printer using a simple network management protocol as a network management protocol, and in a case where the determined number of printers is larger than the threshold number, the timing data is modified to lower an access frequency to a printer of the plurality of printers corresponding to collection of operation information using an expanded management information base.

* * * * *